(12) United States Patent
Yoshihara et al.

(10) Patent No.: US 7,998,611 B2
(45) Date of Patent: Aug. 16, 2011

(54) BATTERY MODULE AND PRODUCTION METHOD THEREOF

(75) Inventors: Yasuo Yoshihara, Kanagawa (JP); Takahiro Fukuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 877 days.

(21) Appl. No.: 11/915,237

(22) PCT Filed: May 18, 2006

(86) PCT No.: PCT/JP2006/309938
§ 371 (c)(1),
(2), (4) Date: Jan. 22, 2008

(87) PCT Pub. No.: WO2006/126447
PCT Pub. Date: Nov. 30, 2006

(65) Prior Publication Data
US 2009/0104516 A1 Apr. 23, 2009

(30) Foreign Application Priority Data

May 23, 2005 (JP) .................... 2005-149880
Apr. 27, 2006 (JP) .................... 2006-124089

(51) Int. Cl.
*H01M 2/00* (2006.01)
(52) U.S. Cl. ........ 429/148; 429/100; 429/123; 429/138; 429/149; 429/158; 429/161; 429/163; 429/170; 429/175; 429/246; 429/247

(58) Field of Classification Search .................. 429/100, 429/123, 129, 130, 133, 138, 140, 142, 148, 429/149, 158, 161, 163, 164, 167, 170, 175, 429/176, 177, 246, 247
See application file for complete search history.

(56) References Cited

U.S. PATENT DOCUMENTS 6,479,187 B1 * 11/2002 Takasaki et al. .............. 429/157
6,541,154 B2   4/2003 Oogami et al.

FOREIGN PATENT DOCUMENTS

| JP | 10-270006 | 10/1998 |
|---|---|---|
| JP | 11-045691 | 2/1999 |
| JP | 2000-040497 | 2/2000 |
| JP | 2000-100417 | 4/2000 |
| JP | 2001-006642 | 1/2001 |
| JP | 2001-148235 | * 5/2001 |
| JP | 2001-266825 | 9/2001 |
| JP | 2003-162993 | 6/2003 |
| JP | 2004-087218 | 3/2004 |

* cited by examiner

*Primary Examiner* — Patrick Ryan
*Assistant Examiner* — Ben Lewis
(74) *Attorney, Agent, or Firm* — McDermott Will & Emery LLP

(57) ABSTRACT

A first row of batteries and a second row of batteries both consisting of the same number of cylindrical batteries (2) arranged in parallel are held at both axial ends using holder frames (3). The holder frame (3) is formed as a rectangular parallelepiped by detachably coupling together an inner frame (4) and two outer frames (7, 8). On both lateral sides of the inner frame (4) and on the sides of the two outer frames (7, 8) opposite the inner frame (4) are provided the same number of holding parts (4a, 7b, 8b) as the rows of batteries, the holding parts being semi-circular cut-outs in which halves of the cylindrical batteries (2) can fit. Each two adjacent cylindrical batteries (2) are electrically interconnected via inter-battery connection plates (9).

27 Claims, 20 Drawing Sheets

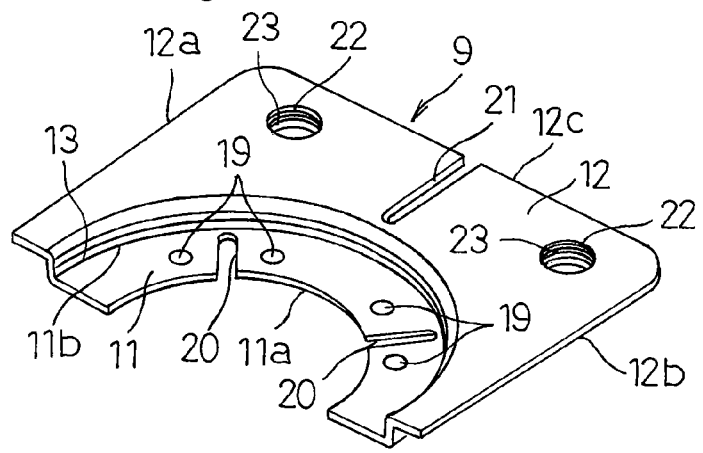
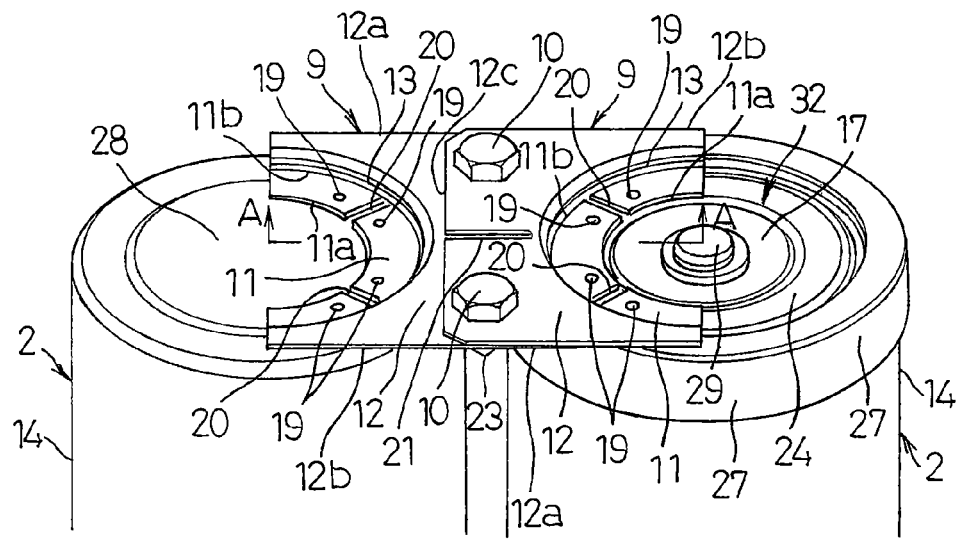
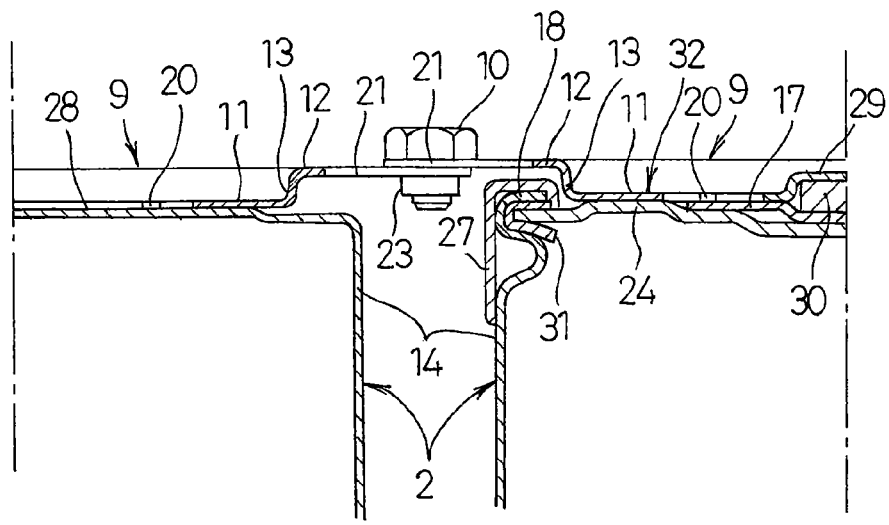

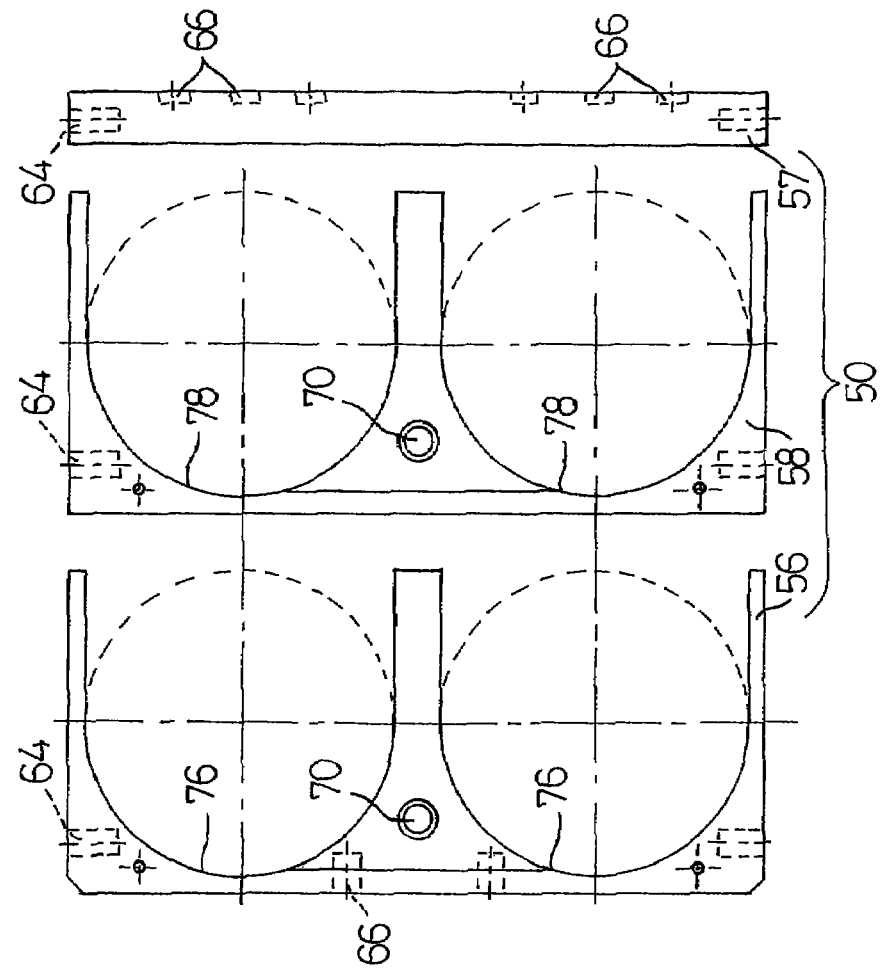
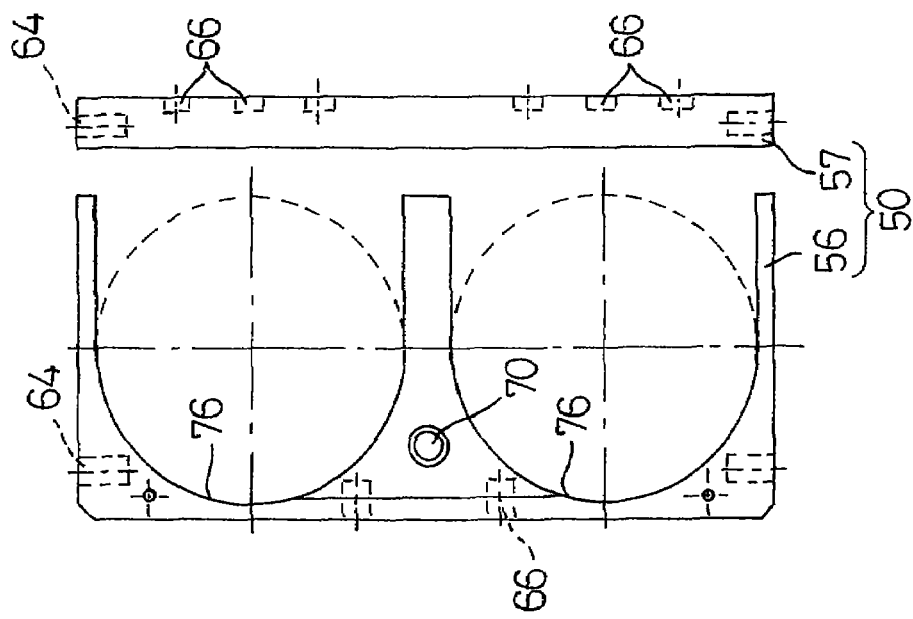

BATTERY MODULE AND PRODUCTION METHOD THEREOF

RELATED APPLICATIONS

This application is the U.S. National Phase under 35 U.S.C. §371 of International Application No. PCT/JP2006/309938, filed on May 18, 2006, which in turn claims the benefit of Japanese Application No. 2005-149880, filed on May 23, 2005 and Japanese Application No. 2006-124089, filed on Apr. 27, 2006, the disclosures of which Applications are incorporated by reference herein.

TECHNICAL FIELD

The present invention relates to a battery module made up of a necessary number of aligned, electrically connected, and mechanically coupled cells to provide a desired output voltage, and a production method that enables assembling of this battery module with high productivity.

BACKGROUND ART

The trend of making AV equipment or electronic equipment such as PCs and mobile communication devices more compact and cordless is accelerated in recent years. For the driving power sources for these electric equipment, nickel cadmium storage batteries, nickel metal-hydride storage batteries, and lithium ion secondary batteries are used because of their high reliability and easy maintenance.

Hybrid electric vehicles, on the other hand, use nickel metal-hydride storage batteries as the power source of the battery-driven motor that is used as the vehicle's driving power source in combination with an internal-combustion engine. For emergency backup power during power outages due to natural disasters such as earthquakes or typhoons, lead storage batteries are most commonly used at the present day, but future practical application of nickel metal-hydride storage batteries is desired, as they have a large capacity and are capable of discharging at a large current. Other expected applications of the large-capacity nickel metal-hydride storage battery include emergency power in unmanned communication bases, and railway power applications such as power source for lifting up train's pantographs, or lighting backup power to be used when power supply to the train is stopped.

The power source device used in the above applications is generally constructed as a battery pack; a necessary number of battery modules are interconnected to provide a desired output voltage, each battery module consisting of a plurality of cylindrical batteries with their power terminals of opposite polarities being connected to each other. A prior application by the applicants of the present invention shows a battery module having high rigidity to withstand vibration or impact (see, for example, Patent Document 1).

The above battery module includes a plastic rectangular parallelepiped holder case having a thickness generally equal to the axial length of the cylindrical batteries. Battery compartment, which is square in top view with its one side being generally equal to the diameter of the cylindrical battery, is formed in one or a plurality of rows extending through the thickness of the case. Opposite polarity terminals of each two adjacent cylindrical batteries which are individually accommodated in these battery compartments are electrically interconnected using flat connection plates. The inter-battery connection structure for connecting each two adjacent cylindrical batteries includes a ring-shaped connection electrode axially protruding outwards from near the outer periphery of the cylindrical battery, the flat connection plate being bridged across the connection electrode of one of each two adjacent cylindrical batteries and the bottom face of the other battery. The contact points between the connection plate and connection electrode and between the connection plate and the bottom face of the battery case are bonded together by welding.

Since the cylindrical batteries are respectively accommodated in their compartments and completely electrically isolated from each other, the battery module requires no insulation rings or outer tubes, whereby a cost reduction is achieved and productivity is improved. Also, since the cylindrical batteries make contact with four partition walls that form the battery compartment at four circumferential points and are thereby fixed in position, they are tightly held even when vibration or impact is applied, and thus the battery module provides a remarkable effect of firm retention of the batteries.

Another known conventional battery pack uses a plastic box-like rectangular holder case with an open top for holding several rows of battery modules in multiple tiers inserted therein; each battery module consists of a plurality of cylindrical batteries electrically connected in series and mechanically coupled together in a row. End plates at both ends of the holder case include bus bars for electrically interconnecting the terminals of the battery modules (see, for example, Patent Document 2). The holder case includes circular through holes in both end walls in the same number as the number of battery modules to be accommodated, which are generally long and columnar in outer shape. Intermediate walls for ensuring stable hold of battery modules are arranged in parallel to both end walls, and are formed with the same number of circular through holes as that of the end walls. The battery modules are inserted into the through holes of the end walls and intermediate walls and thereby held in position in the holder case.

This battery pack has much higher support strength for the battery modules and higher rigidity, and since the battery modules can be coupled to bus bars only by fastening bolts or the like, the process of mounting the battery modules into the holder case is simple and easy.

[Patent Document 1] Japanese Patent Laid-Open Publication No. 2003-162993

[Patent Document 2] Japanese Patent Laid-Open Publication No. 10-270006

DISCLOSURE OF THE INVENTION

Problems to be Solved by the Invention

However, the number of batteries accommodated in this conventional battery module is predetermined, and if there was demand for various types of battery modules differing in shape for various users or purposes of use, new battery modules would have to be designed and produced for each of the desired shapes, and therefore the problem with the battery modules described above was that they could not respond to such demand in a timely manner. There remains other problem for further improvement. That is, in the battery modules described above, to achieve a cooling effect on each cylindrical battery, heat-dissipation passages are formed to let air flow therein, the passages being formed by communicating the gaps formed at four corners of the battery compartment between each cylindrical battery and the partition walls of the compartment with the outside through heat-dissipation holes in lids that close both open ends of the battery compartments. For a relatively large number of cylindrical batteries, the cooling effect thereby achieved is insufficient.

Incidentally, large cylindrical batteries such as nickel metal-hydride storage batteries having a large capacity of about 100 Ah and a relatively heavy weight of about 1.6 Kg are expected to be put in practical use in near future. However, application of such large cylindrical batteries to the conventional battery modules, to be put in practical use, is considered to be extremely difficult because of their structure for the following reasons: The above battery module is produced through the process steps of inserting cylindrical batteries one by one into all of the battery compartments of the holder case, and of connecting each two adjacent cylindrical batteries in the battery compartments by welding both ends of the connection plates. The assembling of large cylindrical batteries through such process steps will be carried out with poor work efficiency and the productivity is expected to deteriorate. Moreover, the cylindrical batteries are shut inside the battery compartments with a pair of lids closing the both open ends in the thickness direction of the holder case and are thereby fixed therein so that they do not move in the axial direction. Therefore, if large cylindrical batteries were used, rigidity would be insufficient to be able to hold the batteries reliably, and strength against vibration or impact would be an issue.

The above battery module is produced through a process in which each two adjacent cylindrical batteries are electrically interconnected after all the batteries have been set in the battery compartments of the holder case. In this process, both ends of connection plates bridged across adjacent batteries are welded one by one to the positive terminal of one battery and to the negative terminal of the other battery. If there is a bond failure during this welding process even in one cylindrical battery, all the cylindrical batteries that have already been accommodated in the holder case have to be replaced. Moreover, because of the structure in which all the cylindrical batteries are electrically interconnected through connection plates welded to their electrode terminals, if some of the batteries are found to be consumed or degraded during maintenance, the entire battery module has to be replaced, which causes a high running cost.

The battery module is made up of a necessary number of cylindrical batteries arranged in a row and electrically and mechanically connected in series, these batteries being entirely covered with a plastic outer tube having electrical insulation and heat shrinking properties. A matrix of, for example, three rows and seven columns of these battery modules are held inside the holder case to form the battery pack. The holder case includes a cooling structure to let air currents flow through the case from air inlets to air outlets so as to cool the battery modules. This cooling structure includes cooling adjustment fin plates, and the direction and flow rate of the air currents are adjusted by cooling adjustment fins that protrude to both sides from the plate bodies. Therefore the cooling effect thereby achieved for the battery modules is sufficient in the above battery pack, but the cooling structure has an extremely complex configuration, which causes a very high cost.

Moreover, in this battery pack, the long columnar battery modules consisting of a predetermined number of cylindrical batteries arranged in a row along the axial direction and electrically connected in series are inserted into and held by through holes respectively formed in both end walls of the holder case and every cooling fin plates. Therefore, this battery pack could hardly be adopted for applications that use the above-mentioned large cylindrical batteries, since heat is generated more in large batteries than in small batteries. Moreover, since every battery module, which is the constituent element, is made up of cylindrical batteries connected in series by welding and covered entirely with the outer tube, when some cylindrical batteries are found to be consumed or degraded during maintenance, the whole battery module needs to be replaced, which causes a high running cost.

The present invention was devised in view of the problems in the conventional techniques described above, and an object of the present invention is to provide a battery module which can be readily produced with high productivity even with large batteries, which has sufficient heat dissipation performance and rigidity, and which has a structure that allows easy replacement of only the cylindrical batteries that have been consumed or degraded, and a production method which enables efficient and reliable assembling of this battery module.

Means for Solving the Problems

To achieve the above object, a battery module according to the present invention includes: a plurality of cells; and a holder frame consisting of a plurality of frames having holding parts that fit with part of outer surfaces of the cells, wherein both axial ends of the cells are held by the holding parts of the respective frames of the holder frame, and each two adjacent cells are electrically interconnected.

This structure provides the merit of excellent versatility because the holder frame that holds the cells can be freely constructed in accordance with a desired configuration of the battery modules.

Furthermore, the cells can be cylindrical batteries, and the battery module includes a row of the cylindrical batteries arranged axially in parallel to each other, and holder frames arranged at both axial ends of the cylindrical batteries, the holder frame being formed integrally in the shape of a rectangular parallelepiped by detachably coupling together the plurality of frames. The frames that are opposite each other in the holder frames include the same number of holding parts as the number of batteries in the rows of the batteries, making contact with the outer surfaces of the cylindrical batteries. Both axial ends of the cylindrical batteries are tightly held from both sides by the holding parts respectively provided to opposite frames of the holder frames. The cylindrical batteries adjoining each other in the row of batteries are electrically interconnected via inter-battery connection plates.

With this structure, the cylindrical batteries that constitute the battery row are held respectively at their axial ends by the holder frames so that their outer surfaces are exposed to the outside except for both ends. Therefore the heat dissipation effect thereby achieved is much higher than that of conventional battery modules. The holder frame can be split up at least into two frames. Both axial ends of all the cylindrical batteries are held from both sides by the holding parts of respective frames of two holder frames. Thus, unlike conventional battery modules which require process steps of inserting cylindrical batteries individually into battery compartments, of electrically connecting the cylindrical batteries in series in the axial direction, and of inserting the rows of batteries into through holes, even large cylindrical batteries can be readily mounted into predetermined locations of the holder frames. Furthermore, the holder frame consists of two frames that are detachably coupled together and it can be split up easily, so that only the cylindrical batteries that have been consumed or degraded can be replaced.

Furthermore, the rows of batteries can include a first row of batteries and a second row of batteries, both made up of the same number of cylindrical batteries arranged axially in parallel to each other. The holder frames provided at both axial ends of the first and second rows of batteries are integrated to rectangular parallelepipeds and each consists of an inner frame, a first outer frame arranged along one side of the inner frame, and a second outer frame arranged along the other side of the inner frame, these frames being detachably coupled together. The holding parts that make contact with the outer surfaces of the cylindrical batteries and hold them are provided in the same number as the number of the batteries in the rows of batteries in both lateral sides of the inner frame, in the side of the first outer frame opposite the inner frame, and in the side of the second outer frame opposite the inner frame. Both the axial ends of the first row of cylindrical batteries are tightly held from both sides by the respective holding parts of the first outer frame and the inner frame opposite each other of each holder frame, and both the axial ends of the second row of cylindrical batteries are tightly held from both sides by the respective holding parts of the second outer frame and the inner frame opposite each other of each holder frame. Adjacent cylindrical batteries in the first and second rows are electrically interconnected through inter-battery connection plates, and two cylindrical batteries at respective ends of both the rows of batteries are electrically interconnected through inter-battery connection plates.

With this structure, the cylindrical batteries forming the first and second rows of batteries are held by holder frames respectively at their axial ends so that their outer surfaces are exposed to the outside except for both ends. Therefore, the heat dissipation effect thereby achieved is much higher than the structure of conventional battery modules in which cylindrical batteries are individually accommodated in battery compartments. The holder frame has a structure that can be divided into three parts, an inner frame and two outer frames, and these frames are formed with holding parts that make contact with the outer surfaces of the cylindrical batteries and hold them. That is, the holder frames are attached to the batteries such that each two holding parts hold each of the cylindrical batteries from both sides at their axial ends. Therefore, unlike conventional battery modules which require process steps of inserting cylindrical batteries individually into battery compartments, of electrically connecting the cylindrical batteries in series in the axial direction, and of inserting the rows of batteries into through holes, even large cylindrical batteries can be readily mounted into predetermined locations of the holder frames. Furthermore, the holder frame consists of an inner frame and two outer frames detachably coupled together and it can be split up easily, so that only the cylindrical batteries that have been consumed or degraded can be replaced.

The holding parts in each frame of the holder frame can be formed in the shape of a semi-circle having a radius of curvature that conforms to an outer shape of the battery. Thereby, when both axial ends of cylindrical batteries are secured in position by the holder frames, each two semi-circular holding parts in each frame can fit from both sides around the outer circumference of the cylindrical battery. Therefore, this structure provides high rigidity, ensuring tight and secure hold of even large cylindrical batteries as they are always stably held at both axial ends by the rectangular parallelepiped holder frames, as compared to conventional techniques with which the through holes in which cylindrical batteries are inserted needed to have a slightly larger diameter than the cylindrical battery so as to provide room for enabling smooth insertion.

Furthermore, each of the frames of the holder frames can include, between each two adjacent holding parts along a direction of lateral sides, screw holes in a shape that extends in a direction orthogonal to the lateral sides. When the frames are arranged opposite each other, these screw holes communicate with each other, and fixing screws are inserted and tightened into these screw holes so that the frames are detachably coupled together. Each two adjacent cylindrical batteries are electrically interconnected in a detachable manner through inter-battery connection plates, which include welded parts that are welded respectively to a positive or negative terminal of the batteries, and connecting parts that extend from the welded parts in directions in which they approach each other; the electrical connection is achieved by thread engagement between respective connecting parts of the inter-battery connection plates. This structure allows the holder frame to be split up extremely easily into the inner frame and two outer frames by removing the fixing screws from the holder frame, and allows the cylindrical batteries to be divided into individual batteries by removing the fixing screws from the inter-battery connection plates. Therefore, when some of the cylindrical batteries are found to be consumed or degraded during maintenance, these cylindrical batteries only can be readily replaced. Accordingly, this battery module provides the merit of largely reducing the running cost as compared to conventional techniques with which, even when only some of the batteries have been consumed or degraded, the whole battery module had to be replaced.

Furthermore, the inner frame can include battery retaining holes extending between centers of two opposite holding parts between both lateral sides, and retaining plug members having elasticity and shaped longer than a length of the battery retaining holes, the plug members being inserted in the battery retaining holes. With this structure, the retaining plug members are compressed inside the battery retaining holes of the inner frame and make pressure contact with the outer surfaces of the two opposite cylindrical batteries on both sides by their elastic restoring force, thereby being capable of absorbing external force when vibration or impact is applied, and ensuring tighter and more stable hold of the cylindrical batteries.

Furthermore, on the outer side of each of the plural frames in the holder frame, the holding parts except for their centers can be formed in a recess dented inwards by a predetermined step from the outer surface. Each two adjacent holding parts are connected together by linear guide supports extending parallel to the direction of arrangement of the holding parts in a recessed position dented inwards by a step, which is smaller than the above-mentioned step, from the outer surface. Furthermore, the two holding parts at one end of the inner frame are connected together by a linear guide support in a recessed position dented inwards from the outer surface. The connecting parts of the inter-battery connection plates fit in between these two guide supports opposite each other. With this structure, the inter-battery connection plates and the bolts and nuts that fasten their connecting parts together are all encased inside the holder frame by these steps and do not protrude to the outside. Accordingly, there is no need of providing insulating means for preventing electrical short-circuiting across cylindrical batteries. Moreover, when forming a battery pack using a necessary number of these battery modules, multiple battery modules can be readily fixed to each other in various matrix arrangements. Also, since each of the inter-battery connection plates is fixed in position as they are fitted in between the pairs of opposite guide supports, the battery module has an enhanced rigidity, which is preferable for applications where large cylindrical batteries are used as individual cells. Moreover, since each two adjacent inter-battery connection plates can more reliably be held in position such that their connecting parts overlap each other during the assembling process, screw fastening efficiency is improved.

Furthermore, the holder frame that holds one axial end of the cylindrical batteries and the holder frame that holds the other axial end are of the same shape, the latter being in a position along the direction of arrangement of the battery row and rotated around the battery axis, so that two rows of cylindrical batteries can be held at both axial ends with the same holder frames, whereby a further reduction in cost is achieved.

More specifically, the holder frames of the battery module may be formed by two frames, respectively, each frame having holding parts that conform to part of the outer surfaces of the cells, so that battery modules that have a relatively small number of cells can be readily produced in accordance with the number or arrangement of cells.

The holder frame of the battery module can be formed by two outer frames each having holding parts that conform to part of the outer surfaces of the cells on one side and an inner frame having holding parts of the same shape on both sides. The outer frames can be joined to both sides of the inner frame, so that opposite holding parts of the inner frame and the outer frames hold the cells from both sides. Or, the holder frames of the battery module can include two or more inner frames between the two outer frames. With these structures, the holder frames can freely be designed to hold a necessary number of cells according to a desired capacity.

The holding parts can be formed in a semi-circular shape having such a radius of curvature that they conform to one half of the outer circumference of the cell, whereby the cells are held stably.

More specifically, one of the opposite frames of the holder frame may have holding parts that have the same radius of curvature as that of the cell and a circular arc not shorter than one half of the circumference of the cell, and another frame may have holding parts that have the same radius of curvature and a circular arc not longer than one half of the circumference of the cell. When these frames are arranged opposite each other and coupled together, their holding parts form a circular shape that matches the entire outer circumference of the cell with the same radius of curvature. With this structure, before coupling the frames to form the holder frame, the cells can fit in the holding parts of one frame, and are not displaced when coupling this frame with another frame, whereby the assembling efficiency of the battery module is improved.

The holding parts may be formed in a polygonal shape having generally the same radius of curvature as that of the outer circumference of the cell, or in a semi-circular shape with the matching radius of curvature corresponding to one half of the outer circumference of the cell with a plurality of notches in the semi-circular surface. Or, the holding parts may be formed with steps, lines connecting tops of the steps being semi-circular having such a radius of curvature that it conforms to one half of the outer circumference of the cell. Or, the holding parts may be formed with comb teeth, lines connecting tops of the comb teeth being semi-circular having such a radius of curvature that it conforms to one half of the outer circumference of the cell. Thereby, while the cells are reliably retained, the small gaps formed between the outer surfaces of the cells and the holding parts help release the heat that is generated during charge and discharge of the batteries.

The holding parts may be formed in a shape that combines a right-angled part and a circular arc part having the same radius of curvature as that of the outer circumference of the cell, so that not only cylindrical batteries but also prismatic batteries can be held. In addition to this, when cylindrical batteries are held, the right-angled parts of the holding parts provides heat release space, while when prismatic batteries are held, the circular arc parts of the holding parts provides heat release space.

The holding parts can be made of a material having elasticity to achieve the effect of preventing misalignment of the cells caused by vibration or impact.

The holding parts may be formed such that their ends protrude by a length that generally covers the outer dimensions of the cells, so that the cells are almost entirely held with one frame. There would be no need of producing one frame that holds part of the cells and another frame that holds the remaining part of the cells, so the number of components can be reduced and consequently a cost reduction can be achieved. With this structure, the whole cells can be held by coupling a flat plate as another frame to the ends of the holding parts, i.e., the second outer frame is made simple and thereby a further cost reduction is achieved.

The above structure may further include an inner frame having holding parts with their ends protruding by a length that generally covers the outer dimensions of the cells. This inner frame is coupled to the outer frame in the same orientation, and a flat plate is coupled to the ends of the holding parts of the inner frame. This structure not only enables a cost reduction to be achieved by simplification of component design and reduction of the number of components, but also allows the holder frame to be designed freely in accordance with a desired battery capacity.

Fixing portions may be provided at the ends of the holding parts on the lines with the same radius of curvature as that of the outer circumference of the cells for holding the cells, so that the cells fit in between the holding parts of the frame and the fixing portions before the holder frames are fastened and are kept in position when coupling together the outer and inner frames and flat plates, whereby the assembling efficiency of the battery module is improved.

The frames may include screw holes in a surface extending in a direction of connection of the frames, the holes extending in a direction orthogonal to the direction of connection of the frames. After the frames are coupled together, a coupler having generally the same length as the joined frames is abutted on the above surface, and fixing screws are tightened into the screw holes through the coupler, so that the holder frame is securely fastened. With this structure, the coupler joins the holder frames firmly and improves the rigidity of the battery module.

Each of the frames of the holder frame may include, in between each two holding parts adjoining in a direction along the lateral sides of the frames, through holes extending along a direction of connection of the frames. When the frames are joined together, these through holes make one continuous through hole, and a bar screw is inserted and tightened into the through hole, to firmly fasten the holder frame. The frames of the holder frame are thus joined together firmly with a simple structure.

The bar screw may be tightened into a nut; such structure allows more flexible assembling of the battery module.

The holder frame may be secured using a bottom plate, a case, or a frame body; such structure allows easy supply of battery modules having excellent versatility for use in battery packs.

To achieve the above object, a production method of a battery module according to the present invention includes the steps of: placing two first outer frames with a predetermined space therebetween, the first outer frames being formed with a predetermined number of semi-circular holding parts only in an upper side and setting the predetermined number of cylindrical batteries in parallel wherein respective halves of one and the other ends of the cylindrical batteries are fitted in the holding parts of the two first outer frames; abutting two inner frames on the two first outer frames respectively, the inner frames being formed with a predetermined number of semi-circular holding parts in upper and lower sides, with respective halves of one and the other ends of the cylindrical batteries being fitted in the holding parts in the lower side; electrically connecting each two adjacent cylindrical batteries using inter-battery connection plates; joining the two first outer frames with the two inner frames respectively at one and the other ends of the cylindrical batteries using fixing screws; setting the predetermined number of cylindrical batteries in parallel wherein respective halves of one and the other ends of the cylindrical batteries are fitted in the holding parts in the upper sides of the two inner frames; abutting two second outer frames on the two inner frames respectively, the second outer frames being formed with a predetermined number of semi-circular holding parts only in a lower side, with respective halves of one and the other ends of the cylindrical batteries on the inner frames being fitted in the holding parts of the second outer frames; electrically connecting each two cylindrical batteries adjoining each other between the inner frames and the second outer frames using inter-battery connection plates; and joining the two second outer frames with the two inner frames respectively at one and the other ends of the cylindrical batteries using fixing screws. With this production method, the battery module is built, in which a plurality of cylindrical batteries are held from both sides respectively by a pair of holder frames arranged at one and the other axial ends of the cylindrical batteries.

With this production method, even when large cylindrical batteries are used, both axial ends of these cylindrical batteries are readily and efficiently secured by the holding parts that conform to the outer circumferential shape of the cylindrical batteries, whereby the battery module of the present invention is produced with high productivity.

Before the assembling process, the two first outer frames may be temporarily fixed by thread engagement on an assembling table with a predetermined space therebetween. After the assembling, this assembling table is removed. This way, even large cylindrical batteries can be reliably assembled into the two holder frames as they are stably fixed in position on the assembling table.

After the inner frames are placed on top of the first outer frames and abutted thereon, retaining plug members may be inserted into corresponding battery retaining holes that extend between the centers of each two opposite holding parts of the inner frames. The retaining plug members are longer than these battery retaining holes and have elasticity, so that their tips make contact with the outer surfaces of the cylindrical batteries to prevent them from rotating. The inner frames and the two outer frames are united by thread engagement to form the holder frames, wherein the retaining plug members are pressed by the outer surfaces of the cylindrical batteries on both sides and compressed inside the battery retaining holes. Thereby, the retaining plug members help keep the state wherein inter-battery connection plates of each two adjacent cylindrical batteries are fixed in position, and the work efficiency of screw-fastening the inter-battery connection plates is improved. Moreover, with these retaining plug members being compressed and making contact with the outer surfaces of the two opposite cylindrical batteries by their elastic restoring force, the battery module structure has excellent vibration resistance and shock resistance.

Furthermore, a pair of inter-battery connection plates are attached beforehand to positive and negative electrode terminals of each cylindrical battery such that their connecting parts protrude in opposite directions to each other, or such that their connecting parts protrude in orthogonal directions to each other. After attaching the cylindrical batteries on the holder frames, the connecting parts of the two inter-battery connection plates protruding from each two adjacent cylindrical batteries in directions in which they approach each other are overlapped and fastened together with screws so as to electrically interconnect the two adjacent cylindrical batteries. Since the cylindrical batteries are first placed on the holder frames and are electrically interconnected by thread engagement between the inter-battery connection plates that have already been secured to the batteries thereby being also mechanically coupled together, there is no need to carry out a welding process as in conventional battery modules in which cylindrical batteries assembled into a holder case or the like are electrically connected together by welding. Since the welding process is not performed, even when large cylindrical batteries are used as the constituent elements, they are readily and efficiently connected to each other and assembled together.

BRIEF DESCRIPTION OF THE DRAWINGS

FIG. 2 is a perspective view illustrating an inter-battery connection plate for electrically connecting each two adjacent cylindrical batteries in the above battery module;

FIG. 3A is a perspective view illustrating the inter-battery connection structure in which two adjacent cylindrical batteries are interconnected using the above inter-battery connection plate, and FIG. 3B is an enlarged cross section taken along the line A-A of FIG. 3A;

FIG. 25A is a plan view illustrating the structure of the holder frame that uses the above outer frame and a flat outer frame, and FIG. 25B is a plan view illustrating the structure of the holder frame that uses the above outer frame, a flat outer frame, and an inner frame having a shape in which both ends of the holding parts extend generally as long as the outer circumference of the cells.

BEST MODE FOR CARRYING OUT THE INVENTION

Figure 1:
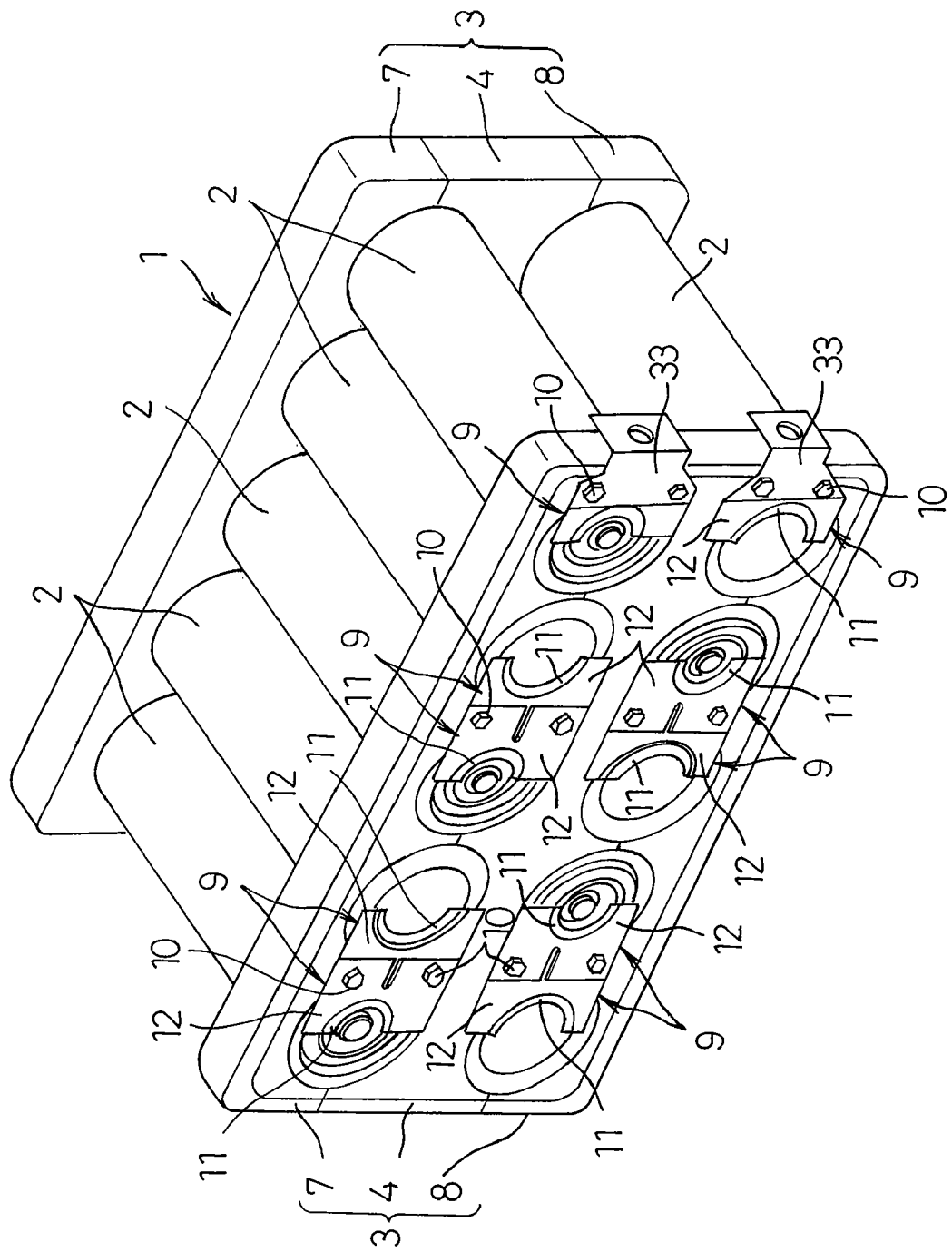
FIG. 1 is a schematic perspective view illustrating the external appearance of the battery module according to one embodiment of the present invention.

Preferred embodiments of the present invention will be hereinafter described in detail with reference to the drawings. FIG. 1 is a schematic perspective view illustrating the external appearance of the battery module 1 according to one embodiment of the present invention. This battery module 1 is made up of ten cylindrical batteries 2: Two rows of five batteries arranged in parallel along the axis are stacked in upper and lower tiers; both axial ends of these ten cylindrical batteries 2 are retained and held by holder frames 3. Since the outer surfaces of the ten cylindrical batteries 2 connected to each other are exposed to the outside except for their ends, this battery module 1 has much better heat dissipation properties than a conventional design in which each of the cylindrical batteries is accommodated in respective battery compartment.

In the present embodiment, the cylindrical battery 2 is for example a large cylindrical battery 2 such as a nickel metal-hydride storage battery having a large capacity of about 100 Ah and a relatively heavy weight of about 1.6 Kg. Even with such large cylindrical batteries 2, the battery module 1 can be assembled with high productivity and good efficiency, and also the battery module can have enough rigidity. This will be described later in detail.

The pair of holder frames 3 in the front and back of FIG. 1 each consists of an inner frame 4 and first and second outer frames 7 and 8 above and below the inner frame, these being coupled together and detachably secured so that they as a whole form a integrated rectangular parallelepiped with a rectangular outer shape. The inner frame 4 and the outer frames 7 and 8 are all single molded pieces of plastic, but they may be single molded pieces of aluminum in consideration of heat dissipation properties. The pair of holder frames 3 in the front and back are both the same. These parallel arranged holder frames 3, however, are oriented oppositely and upside-down. Each two cylindrical batteries adjoining each other in the direction of the row are electrically interconnected by inter-battery connection plates 9 respectively secured to the batteries being partly superposed and fastened together by thread engagement between bolts 10 and nuts (not shown). FIG. 1 shows one example of the battery module 1 that holds ten cylindrical batteries 2, but it will be understood that, with the use of the holder frame 3 of the present invention, it is not necessary to produce holder frames dedicated to hold ten cylindrical batteries 2. This is because, by freely combining the first outer frame 7, second outer frame 8, and inner frame 4, battery modules can be constructed in various different shapes in accordance with the needs of the users or the purposes of use. Thus the holder frame of the invention provides excellent general versatility, as it can satisfy various needs in a timely manner. The battery module 1 will be described step by step in more detail below.

FIG. 2 is a perspective view showing the above inter-battery connection plate 9. All the inter-battery connection plates 9 are of the same type having the same shape. That is, all the two adjacent cylindrical batteries 2 are electrically interconnected using identical inter-battery connection plates 9. The inter-battery connection plate 9 includes a welded part 11 secured to a battery case that will be described later by a welding means, a connecting part 12 extending from the welded part 11, these being formed integrally via a step 13; the welded part 11 is dented relative to the connecting part 12 because of the step 13.

FIG. 3A is a perspective view illustrating the inter-battery connection structure in which each two adjacent cylindrical batteries 2 are electrically connected and mechanically coupled to each other using the above inter-battery connection plate 9, and FIG. 3B is an enlarged cross section taken along the line A-A of FIG. 3A. A supplementary description of the shape of the inter-battery connection plate 9 will be provided with reference to FIG. 3A and FIG. 3B. The welded part 11 has a semi-circular shape that is contained in the circular end face of the battery case 14 of the cylindrical battery 2. More specifically, the semi-circular shape is defined by a semi-circular inner periphery 11a and a semi-circular outer periphery 11b; the former has a slightly larger radius of curvature than the circumference of the circular terminal plate 17 of the cylindrical battery 2, and the latter has the same radius of curvature as the inner circumference of the circular crimped edge 18 at the open end of the battery case 14. The welded part 11 is provided with a plurality of (four in the present embodiment) projections 19 for the purpose of spot-welding. Slits 20 are formed between each two adjacent projections 19.

The connecting part 12 is generally rectangular having a pair of lateral sides 12a and 12b and an end side 12c orthogonal to the lateral sides 12a and 12b. The two lateral sides 12a and 12b extend from the welded part 11 parallel to each other and are distanced from each other by a length larger than the end-to-end distance of the welded part 11 and slightly smaller than the diameter of the battery case 14. The connecting part 12 is formed with a slit 21 in the middle of the end side 12c extending parallel to the lateral sides 12a and 12b, and a pair of fastening holes 22 near both ends of the end side 12c. The connecting part 12 may include a pair of nuts 23 secured to the lower face by welding at positions matching the fastening holes 22, as shown in FIG. 2.

The step 13 is semi-circular in plan view and defined by a standing portion standing from the semi-circular outer edge 11b of the welded part 11; its outer side face on the side of the connecting part 12 is formed semi-circular with the same radius of curvature as the inner circumference of the crimped edge 18 at the open end of the battery case 14. The step has a height slightly larger than the distance between the sealing plate 24 and the axial end of the crimped edge 18 of the cylindrical battery 2. The inter-battery connection plate 9 having the welded part 11 and the connecting part 12 integrally formed via the step 13 is a single piece of material consisting of iron or copper plated with nickel at least on one side, or of material consisting of nickel, iron, and copper, so as to have low electrical resistance.

The cylindrical battery 2, which is the object to be connected, of this embodiment of the battery module 1 is a large nickel metal-hydride storage battery having a large capacity as mentioned above. The structure of this cylindrical battery 2 will be roughly described next with reference to FIG. 3B. A closure assembly 32 closes one open end of the cylindrical battery case 14 having a bottom and serving as the negative terminal. The closure assembly 32 is made up of a sealing plate 24, an electrode terminal plate 17 bonded to the outer face of the sealing plate 24, a cap-like positive terminal 29 having a U-shaped cross section and secured to the center of the electrode terminal plate 17, a rubber valve element 30 set in a space between the cap-like positive terminal 29 and the electrode terminal plate 17, and an insulating gasket 31.

The insulating gasket 31 is interposed between the sealing plate 24 and the open end of the battery case 14 and the open end edge of the battery case 14 is crimped inwards, thereby forming the crimped edge 18; the circumferential edge of the sealing plate 24 and the open end of the battery case 14 are thus secured to each other in an airtight manner via the insulating gasket 31 compressed by the crimped edge 18. An insulating ring 27 capped over the crimped edge 18 prevents short-circuiting across the battery case 14 and the sealing plate 24 via the inter-battery connection plate 9. Since the welded part 11 of the inter-battery connection plate 9 has a semi-circular shape that is contained in the circular end face of the battery case 14, the inter-battery connection plate 9 can be attached to both of the sealing plate 24 to which the cap-like positive terminal 29, which is the positive terminal of the cylindrical battery 2, is bonded, and the bottom face 28 of the battery case 14, which is the negative terminal of the battery.

When welding the welded part 11 to the sealing plate 24 to attach the inter-battery connection plate 9 on the cylindrical battery 2, the welded part 11 is placed upon the sealing plate 24 of the battery 2 such that the outer side face of the step 13 makes contact with the inner periphery of the insulating ring 27. Since the outer side face of the step 13 is formed semi-circular with generally the same radius of curvature as that of the inner periphery of the insulating ring 27, the inter-battery connection plate 9 is set tightly in position relative to the battery with the outer side face of the step 13 generally fitting with the inner periphery of the insulating ring 27. Therefore the inter-battery connection plate 9 is stably retained during the welding of the welded part 11 to the sealing plate 24. This ensures that a highly rigid weld is always formed between the welded part 11 and the sealing plate 24 with no variation in the welding strength.

For the above welding, projection welding is performed, using welding electrodes abutted respectively on the portions corresponding to the pair of projections 19 in the welded part 11. The welding current concentrates locally on the interfaces between the projections 19 and the sealing plate 24 where the contact resistance is large because of the small contact area, thereby generating heat, which melts the projections 19 and bonds the welded part 11 and the sealing plate 24 together. The slits 20 in the welded part 11 help reduce reactive current during the projection welding as well as absorb distortion of the welded part 11 relative to the sealing plate 24 by allowing the welded part 11 to deform, whereby welding is performed reliably.

On the other hand, when attaching the inter-battery connection plate 9 to the bottom face 28 of the battery case 14 of the cylindrical battery 2 by welding, the welded part 11 is placed upon the bottom face 28 of the battery case 14 of the cylindrical battery 2, and projection welding is performed, using welding electrodes abutted respectively on the portions corresponding to the pair of projections 19 in the welded part 11. The welding current concentrates locally on the interfaces between the projections 19 and the bottom face 28 where the contact resistance is large because of the small contact area, thereby generating heat, which melts the projections 19 and bonds the welded part 11 and the bottom face 28 together. The slits 20 in the welded part 11 help reduce reactive current during the projection welding as well as absorb distortion of the welded part 11 relative to the bottom face 28 by allowing the welded part 11 to deform, whereby welding is performed reliably.

When radially connecting two cylindrical batteries 2 arranged in parallel to the axial direction to connect them electrically in series, as shown in FIG. 3A and FIG. 3B, the connecting parts 12 of the two inter-battery connection plates 9 radially protruding outwards from the open end and the bottom face 28 of the battery case 14 are superposed upon one another in opposite directions; they are positioned relative to each other such that their respective pairs of fastening holes (not shown) in which the bolts 10 are inserted as illustrated coincide with each other; the bolts 10 inserted from one side of the two overlapped fastening holes are thread-engaged with the nuts 23 on the other side, whereby the two inter-battery connection plates 9 are coupled together in electrical connection with each other. The slits 21 allow the inter-battery connection plates 9 to deform easily during this connection so as to absorb distortion that may differ between the two inter-battery connection plates 9, whereby reliable fastening is performed. With this inter-battery connection structure, identical inter-battery connection plates 9 are attached to both of the positive-side sealing plate 24 and the bottom face 28 of the battery case 14. If, however, the nuts 23 are secured by welding to one surface of the inter-battery connection plates 9 that will be attached to the bottom face 28 of the battery case 14 at positions matching the fastening holes, then the above-described coupling operation can be carried out even more easily and swiftly.

Figure 4A:
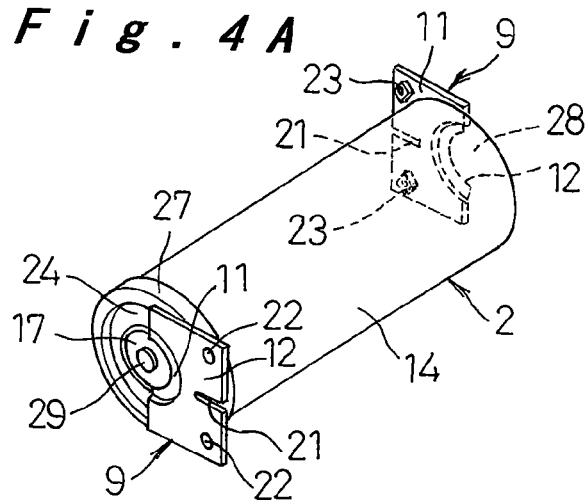
FIG. 4A and FIG. 4B are perspective views illustrating how the inter-battery connection plate is attached to the cylindrical batteries prior to construction of the above battery module.
Figure 4B:
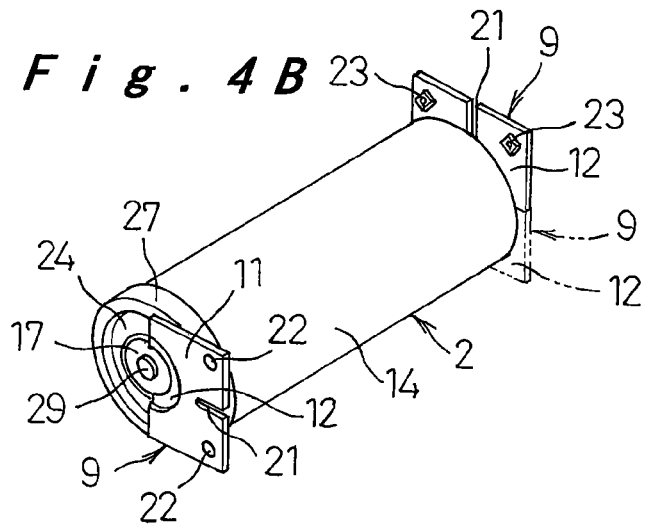

To make the battery module 1 of FIG. 1, inter-battery connection plates 9 are attached by welding to each of the cylindrical batteries 2 as respectively illustrated in FIG. 4A and FIG. 4B prior to production. To build the battery module 1 consisting of ten cylindrical batteries 2 connected in series as shown in FIG. 1, eight out of ten cylindrical batteries 2 are provided with a pair of inter-battery connection plates 9 beforehand, welded respectively to the positive-side sealing plate 24 and the bottom face 28 of the battery case 14 such that their connecting parts 12 protrude in opposite directions as shown in FIG. 4A. To the remaining two cylindrical batteries 2 are bonded a pair of inter-battery connection plates 9 beforehand in two different orientations as illustrated by solid lines and two dotted chain lines in FIG. 4B, welded respectively to the positive-side sealing plate 24 and the bottom face 28 of the battery case 14 such that their connecting parts 12 protrude in different orthogonal directions. In the present embodiment, nuts 23 are welded beforehand at positions matching the fastening holes 22 of the inter-battery connection plates 9 that will be attached to the bottom face 28, i.e., the negative terminal, of the battery case 14.

Figure 5:
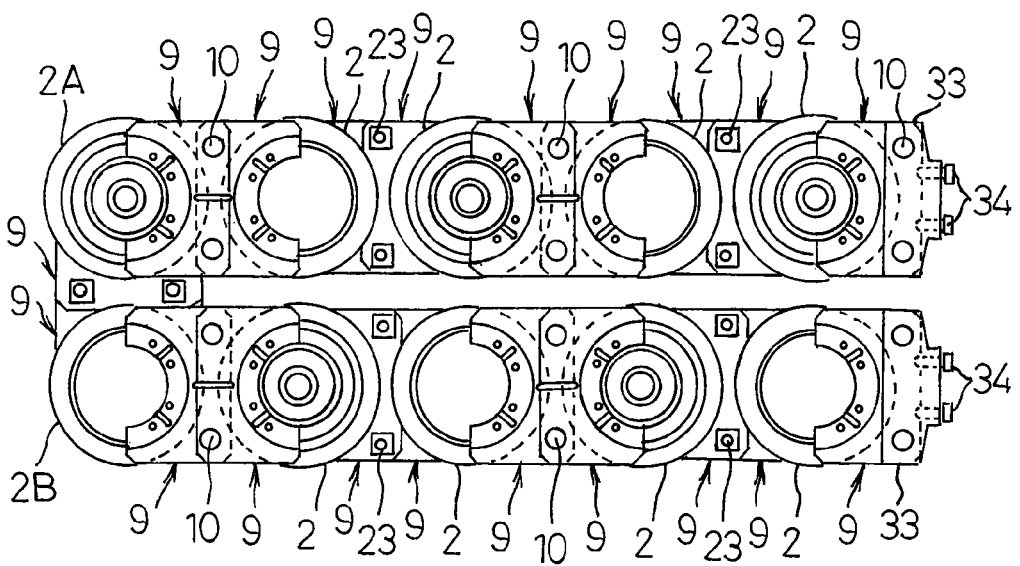
FIG. 5 is a front view illustrating only the connection state of all the cylindrical batteries in the above battery module.

FIG. 5 illustrates only the connection state of the ten cylindrical batteries 2 in the battery module 1 of FIG. 1. Eight cylindrical batteries 2, other than the two, upper and lower, batteries 2A and 2B at the left end of the drawing, are all provided with the pair of inter-battery connection plates 9 attached beforehand in the orientation shown in FIG. 4A; each two adjacent cylindrical batteries 2 are electrically interconnected at both ends in the front and in the back of the drawing by the inter-battery connection structure described with reference to FIG. 3. The upper cylindrical battery 2A at the left end has a pair of inter-battery connection plates 9 secured beforehand in the orientation as illustrated by the two dotted chain lines in FIG. 4B, while the lower cylindrical battery 2B at the left end has a pair of inter-battery connection plates 9 secured beforehand in the orientation as illustrated by the solid lines in FIG. 4B. The upper and lower cylindrical batteries 2A and 2B at the left end are electrically interconnected via their inter-battery connection plates 9 at the end in the back of the drawing. Accordingly, the ten cylindrical batteries 2, 2A, and 2B are connected in series, and the upper and lower cylindrical batteries 2 at the right end of the drawing, which are the end batteries of the series-connected batteries, have external connection terminal plates 33 fastened with bolts 10 to the connecting parts 12 of the inter-battery connection plates 9 at one end in the front of the drawing. To the external connection terminal plates 33 are connected terminal screws 34.

Figure 6:
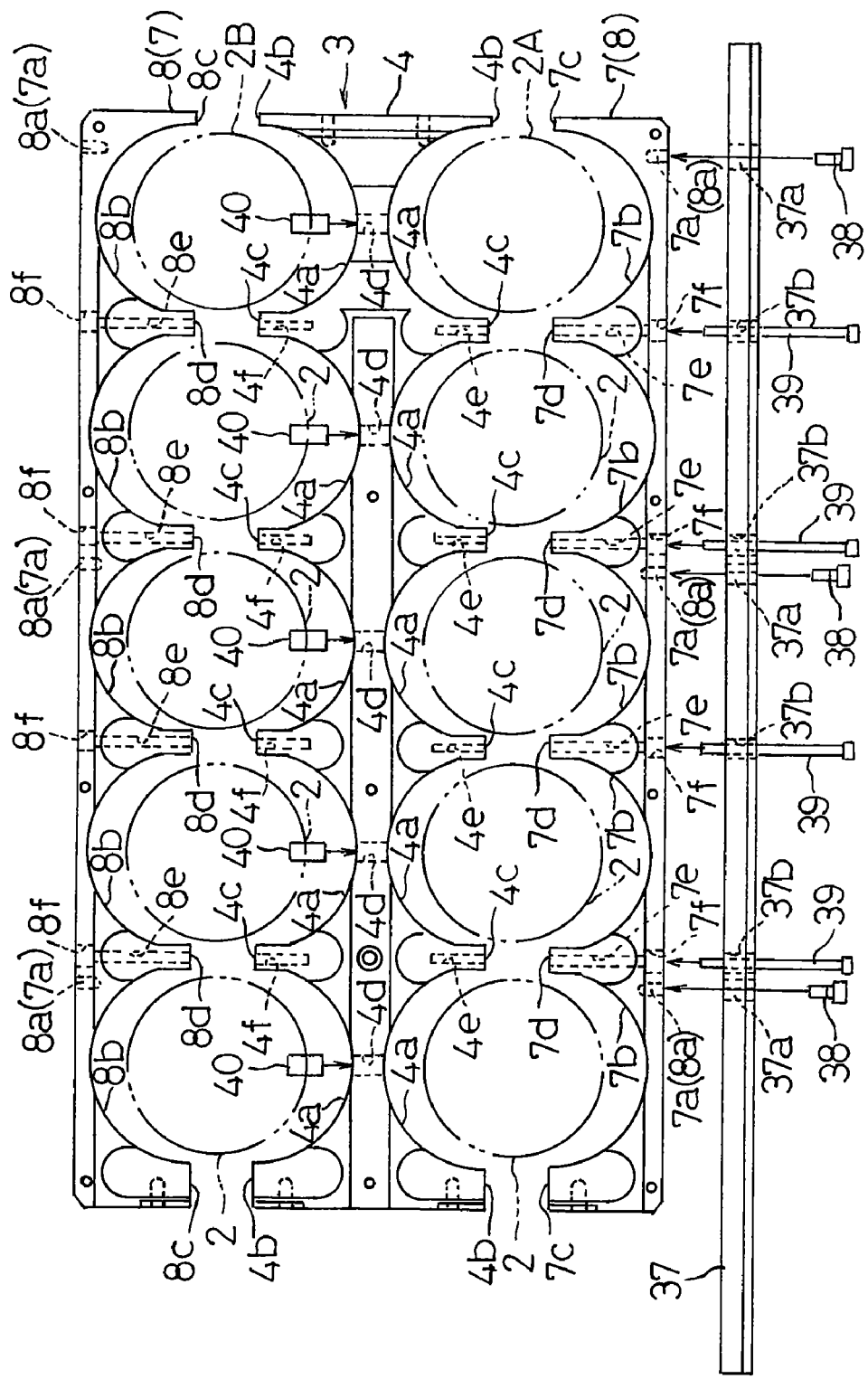
FIG. 6 is a schematic exploded front view given in explanation of the assembling steps of the above battery module.

Next, the assembling process of the battery module 1 of FIG. 1 will be described. FIG. 6 is a schematic exploded front view given in explanation of the assembling steps of the battery module 1. The drawing shows the battery module 1 of FIG. 1 upside down, i.e., in the illustrated example, the battery module 1 is assembled in an orientation achieved by rotating the state shown in FIG. 1 around the vertical axes of the cylindrical batteries 2 so that the left side and the right side are inverted. The same inner frame 4 and the first and second outer frames 7 and 8 are assembled at positions in the front and in the back of FIG. 6 into the holder frames 3. Note, the holder frame 3 in the back is oriented oppositely from the holder frame 3 in the front; it is rotated from the position in the front of the drawing around a horizontal axis extending in the left and right direction so that it is upside down.

First, on an assembling table 37, the first outer frame 7 is placed in the front of the drawing and the second outer frame 8 is placed in the back of the drawing. Three screw holes 7a and 8a respectively provided in these outer frames 7 and 8 are positioned to match attachment holes 37a in the assembling table 37, and bolts 38 are inserted into the respective attachment holes 37a to engage with the screw holes 7a and 8a. Thereby, the first outer frame 7 and the second outer frame 8 are temporarily fixed on the front side and on the back side on the assembling table 37 at predetermined positions relative to each other, i.e., at opposite parallel positions with a space in between.

Next, both axial ends of the cylindrical batteries 2 or 2A are fitted from above down onto semi-circular holding parts 7b and 8b, five each of which are formed as cut-outs in the upper sides of the first and second outer frames 7 and 8 temporarily secured in the front and back on the assembling table 37. The five cylindrical batteries 2 or 2A are fitted in after being rotated from the state shown in FIG. 5 around an axis in the left and right direction so that they are inverted upside down. Thus the five cylindrical batteries 2 or 2A are bridged across the holding parts 7b of the first outer frame 7 on the front side and the holding parts 8b of the second outer frame 8 on the back side, the halves of their axial ends being engaged with and supported by the holding parts. These holding parts 7b and 8b are formed semi-circular with a radius of curvature that conforms to the outer shape of the cylindrical batteries 2 or 2A so that the halves of the axial ends of the cylindrical batteries 2 or 2A are engaged with and supported by the holding parts 7b and 8b.

Next, inner frames 4 are placed on top of the first and second outer frames 7 and 8 in the front and in the back respectively, so that the other halves of the cylindrical batteries 2 and 2A fit into semi-circular holding parts 4a formed as cut-outs in the lower sides of the inner frames 4. These holding parts 4a are formed semi-circular with a radius of curvature that conforms to the outer shape of the cylindrical batteries 2 or 2A. The outer end surfaces 4b at both ends of the inner frame 4 and the inner end surfaces 4c on the inner side thereof respectively make contact with the outer end surfaces 7c and 8c at both ends of the first and second outer frames 7 and 8 and the inner end surfaces 7d and 8d on the inner side thereof. Therefore, the five cylindrical batteries 2 or 2A are held from the upper and lower sides around the entire circumference at both axial ends by the holding parts 7b and 8b of the first and second outer frames 7 and 8 and the holding parts 4a of the inner frames 4.

Successively, the five cylindrical batteries 2 or 2A that are supported at their axial ends by the inner frames 4 and the first and second outer frames 7 and 8 are adjusted in their position so that the fastening holes 22 in the connecting parts 12 of the inter-battery connection plates 9 attached to each two adjacent batteries match each other. In this position, retaining rubber plugs 40 are inserted from above as indicated by the arrows into five battery retaining holes 4d respectively extending through the center of each holding part 4a of the front and back inner frames 4. Each of the retaining rubber plugs 40 makes contact at the bottom with the outer surface of the cylindrical battery 2 or 2A. The retaining rubber plugs 40 are slightly longer than the battery retaining holes 4d so that, when they are inserted into the holes, they protrude slightly from the upper end openings of the battery retaining holes 4d as shown in the drawing.

Thus, with the connecting parts 12 of the inter-battery connection plates 9 overlapping each other between each two adjacent cylindrical batteries 2 or 2A, these five batteries are interconnected by thread engagement between the bolts 10 and nuts 23 through the fastening holes 22. The five cylindrical batteries 2 or 2A in the lower tier are thus connected in series and form a first row of batteries. Note, the inter-battery connection plate 9 attached on the back side of the cylindrical battery 2A at the right end of FIG. 6 is oriented so that its connecting part 12 protrudes upwards and is not connected to any other inter-battery connection plate 9 at this point. The nuts 23 have already been secured in positions matching the fastening holes 22 of the connecting parts 12 on the inner side, i.e., the ones near the cylindrical batteries 2 or 2A, of the two overlapping connecting parts 12, so the coupling of each two inter-battery connection plates 9 is carried out readily and swiftly, as it is only necessary to insert the bolts 10 into the two overlapping fastening holes 22 to be engaged with the nuts 23.

Then, fixing screws 39, four each on the front side and on the back side, are inserted into through holes 7e in the first outer frame 7 in the front and through holes 8e in the second outer frame 8 in the back, and thread-engaged with respective screw holes 4e in the lower side of the inner frames 4, so as to connect together the first outer frame 7 and the inner frame 4 on the front side and the second outer frame 8 and the inner frame 4 on the back side, respectively. This makes the five cylindrical batteries 2 or 2A firmly secured at their axial ends by the inner frames 4 and the first and second outer frames 7 and 8, which are united. In other words, both ends of the five cylindrical batteries 2 or 2A are held snugly in retainer holes, which are respectively formed by the holding parts 7b and 8b of the first and second outer frames 7 and 8 and the holding parts 4a of the inner frames 4 combined together.

Successively, five cylindrical batteries 2 or 2B in the upper tier, rotated from the state shown in FIG. 5 around an axis in the left and right direction to be inverted upside down, are fitted into semi-circular holding parts 4a formed in the upper sides of the inner frames 4 in the front and in the back. The holding parts 4a of the inner frames 4 are formed semi-circular with a radius of curvature that conforms to the outer shape of the cylindrical batteries 2 or 2A. Therefore, the five cylindrical batteries 2 or 2B are bridged across the front and back holding parts 4a, with their axial ends snugly fitting in the holding parts 4a of the inner frames in the front and in the back.

Next, the second and first outer frames 8 and 7 are respectively placed on top of the front and back inner frames 4 so that the upper halves of the cylindrical batteries 2 or 2A fit into the semi-circular holding parts 8b and 7b formed in the second and first outer frames 8 and 7. These holding parts 8b and 7b are formed semi-circular with a radius of curvature that conforms to the outer shape of the cylindrical batteries 2 or 2B. The outer end surfaces 8c and 7c at both ends of the second and first outer frames 8 and 7 and the inner end surfaces 8d and 7d on the inner side thereof respectively make contact with the outer end surfaces 4b at both ends of the inner frames 4 and the inner end surfaces 4c on the inner side thereof. Therefore, the five cylindrical batteries 5 or 5B are held snugly from the upper and lower sides around the entire circumference at both axial ends between the holding parts 8b and 7b of the second and first outer frames 8 and 7 and the holding parts 4a of the inner frames 4.

Successively, the five upper-tier cylindrical batteries 2 or 2B are adjusted in their position so that the fastening holes 22 in the connecting parts 12 of the inter-battery connection plates 9 attached to each two batteries adjoining in the direction of the row of batteries match each other. After their positions have been adjusted, the cylindrical batteries 2 or 2B are prevented from rotating by the retaining rubber plugs 40 slightly protruding from the upper openings of the battery retaining holes 4d of the inner frames 4 making contact with the outer surfaces of the batteries. Therefore the batteries are retained in the position where the fastening holes 22 in the connecting parts 12 of the connection holes 9 match each other.

In this position where the five upper-tier cylindrical batteries 2 or 2B are prevented from rotating, each two cylindrical batteries 2 or 2B adjoining each other in the direction of the row of batteries are interconnected by thread engagement between the bolts 10 and nuts 23 through the fastening holes 22 in the connecting parts 12 of the connection holes 9. Also, respective connecting parts 12 of the cylindrical battery 2B at the right end and the cylindrical battery 2A below are connected to each other by thread engagement between the bolts 10 and nuts 23. Thus the ten cylindrical batteries 2, 2A and 2B are all connected in series. The nuts 23 have already been secured in positions matching the fastening holes 22 of the connecting parts 12 on the inner side, i.e., the ones near the cylindrical batteries 2 or 2A, of the two overlapping connecting parts 12, so the coupling of each two inter-battery connection plates 9 is carried out readily and swiftly, as it is only necessary to insert the bolts 10 into the two overlapping fastening holes 22 to be engaged with the nuts 23.

Lastly, fixing screws 39 similar to those illustrated in the lower part of the drawing are inserted into through holes 8e in the second outer frame 8 in the front and through holes 7e in the first outer frame 7 in the back, and thread-engaged with respective screw holes 4f in the upper sides of the inner frames 4, so as to connect together the second outer frame 8 and the inner frame 4 on the front side and the first outer frame 7 and the inner frame 4 on the back side, respectively. This makes the five upper-tier cylindrical batteries 2 or 2B firmly secured at their axial ends by the inner frames 4 and the second and first outer frames 8 and 7, which are united. With the second row of batteries being thus formed, the assembling of the battery module of FIG. 1 is complete.

In the battery module 1 that has been assembled as described above, the five retaining rubber plugs 40 are compressed inside the battery retaining holes 4d by the pressure from the cylindrical batteries 2, 2A, and 2B above and below because of the fastening of the upper and lower fastening screws 39. The rubber plugs 40 therefore make pressure contact with the cylindrical batteries 2, 2A, and 2B by their restoring force, thereby holding the batteries without any play. Lastly, the bolts 38 are released to remove the assembling table 37.

This embodiment of the battery module 1, as it is assembled through the steps described above, can be readily and efficiently assembled even if cylindrical batteries 2 having a relatively heavy weight of about 1.6 kg as mentioned above are used as individual cells. The holder frames 3 have a three-part structure with inner frames 4 and first and second outer frames 7 and 8, so that all of the cylindrical batteries 2 can be fitted individually into the holding parts 4a, 7b, and 8b of respective frames 4, 7, and 8 such that they are dropped from above. Therefore, unlike conventional battery modules that require a process of inserting each of the cylindrical batteries individually into battery compartments, or a process of inserting rows of cylindrical batteries 2 that are electrically connected in series in the axial direction into through holes, even large cylindrical batteries 2 can be readily assembled into and held in respective locations in the holder frames 3.

After setting the cylindrical batteries 2 in the holder frames 3, the inter-battery connection plates 9 that have been attached to the batteries are electrically connected and mechanically coupled together by thread engagement between the bolts 10 and the nuts 23. Therefore, the welding process that was required for conventional battery modules to electrically connect the cylindrical batteries 2 mounted in a holder case or the like is not necessary. As the welding process is made unnecessary, even if large cylindrical batteries 2 are adopted as constituent elements, they can be readily and efficiently connected to each other and assembled together.

Moreover, since the lowermost first and second outer frames 7 and 8 in the front and in the back are temporarily secured in position on the assembling table 37 before the assembling of the battery module 1, the assembling process of large cylindrical batteries 2 can be carried out stably and reliably in this respect, too.

In fixing both axial ends of the cylindrical batteries 2 in the holder frames 3, two of the semi-circular holding parts 4a, 7b, and 8b formed in respective frames 4, 7, and 8 are fitted on the outer surfaces of the cylindrical batteries 2 such as to surround the batteries from both sides, and therefore, the semi-circular holding parts 4a, 7b, and 8b can have a radius of curvature that conforms to the outer shape of the cylindrical batteries 2. In conventional battery modules in which cylindrical batteries 2 are inserted into through holes, the through holes need to have a slightly larger diameter than the cylindrical batteries 2 to provide room for smooth insertion. Unlike such a design, two semi-circular holding parts 4a, 7b, and 8b are joined together to form through holes that have substantially the same outer diameter as that of the cylindrical batteries 2. Therefore, this battery module 1, even though it is made up of large cylindrical batteries 2, has a rigid structure, with both axial ends of the cylindrical batteries 2 being firmly secured without any play in the rectangular parallelepiped holder frames 3 and always held stably.

The retaining rubber plugs 40 compressed inside the battery retaining holes 4d of the inner frames 4 make pressure contact with the outer surfaces of the two opposite cylindrical batteries 2 above and below by their restoring force and absorb external force when vibration or impact is applied. Therefore, the cylindrical batteries 2 are held stably without any play.

If some of the cylindrical batteries 2 are found to be consumed or degraded during maintenance, the battery module 1 allows only necessary batteries to be replaced, because the holder frames 3 can be easily split up into inner frames 4 and first and second outer frames 7 and 8 only by removing the fastening screws 39, and individual cylindrical batteries 2 can be removed only by removing the bolts 10 in the inter-battery connection plates 9. While, conventionally, the whole battery module had to be replaced just because some batteries have been consumed or degraded, this battery module 1 provides the great merit of largely reducing the running cost.

Figure 7:
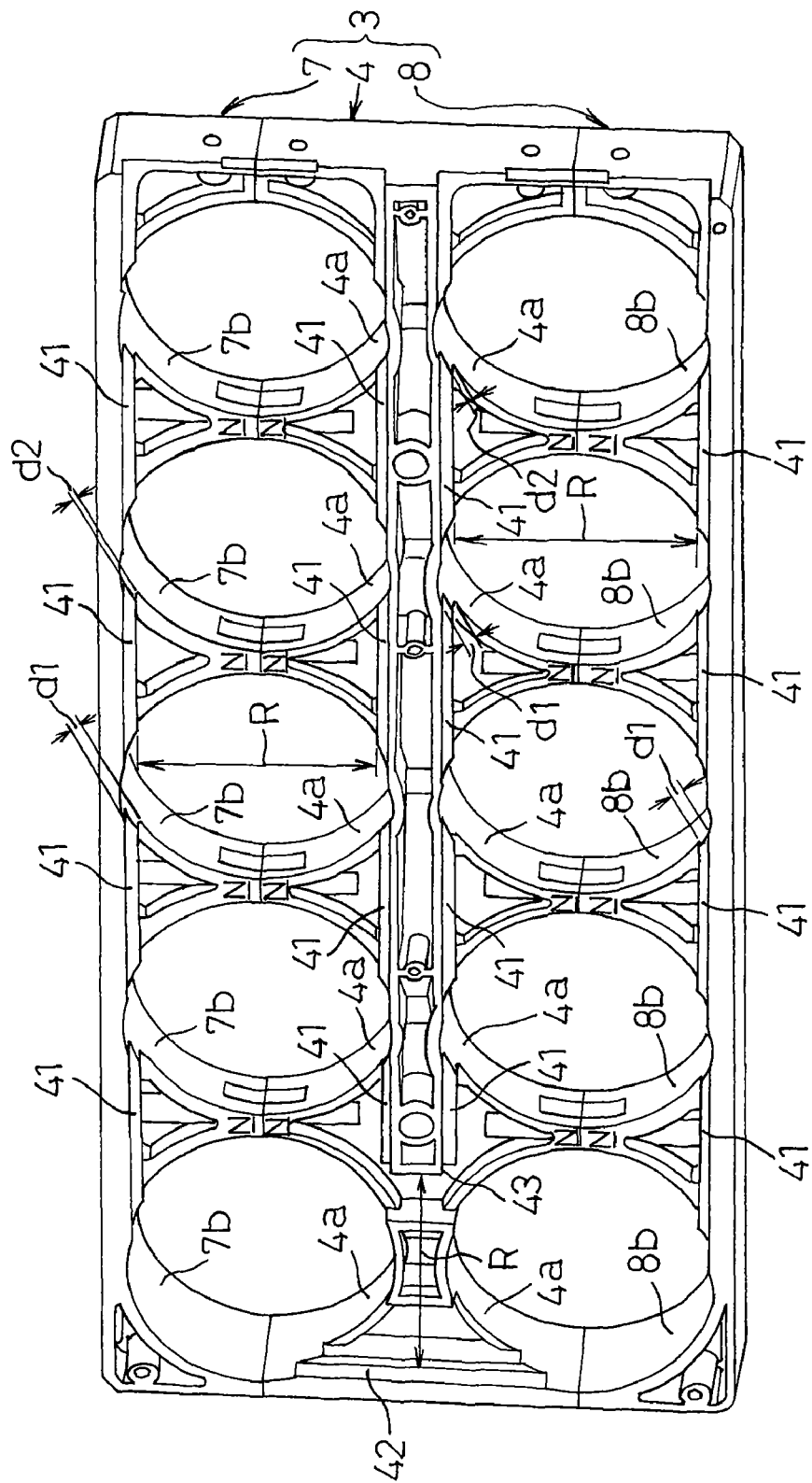
FIG. 7 is a perspective view shown from an outer side of the above battery module illustrating only the holder frame of the battery module.
Figure 8:
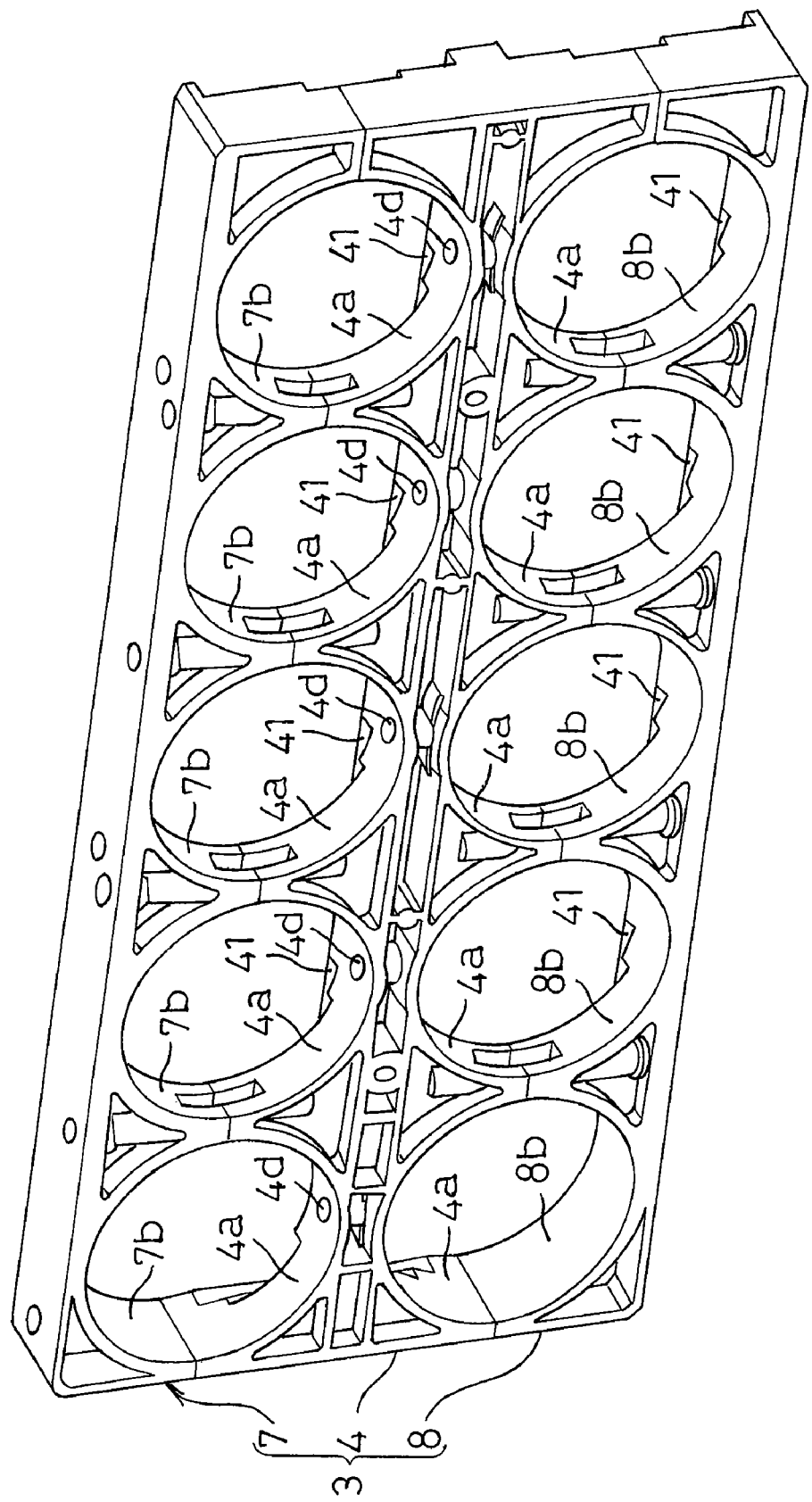
FIG. 8 is a perspective view illustrating the above holder frame from an inner side of the battery module.
Figure 9:
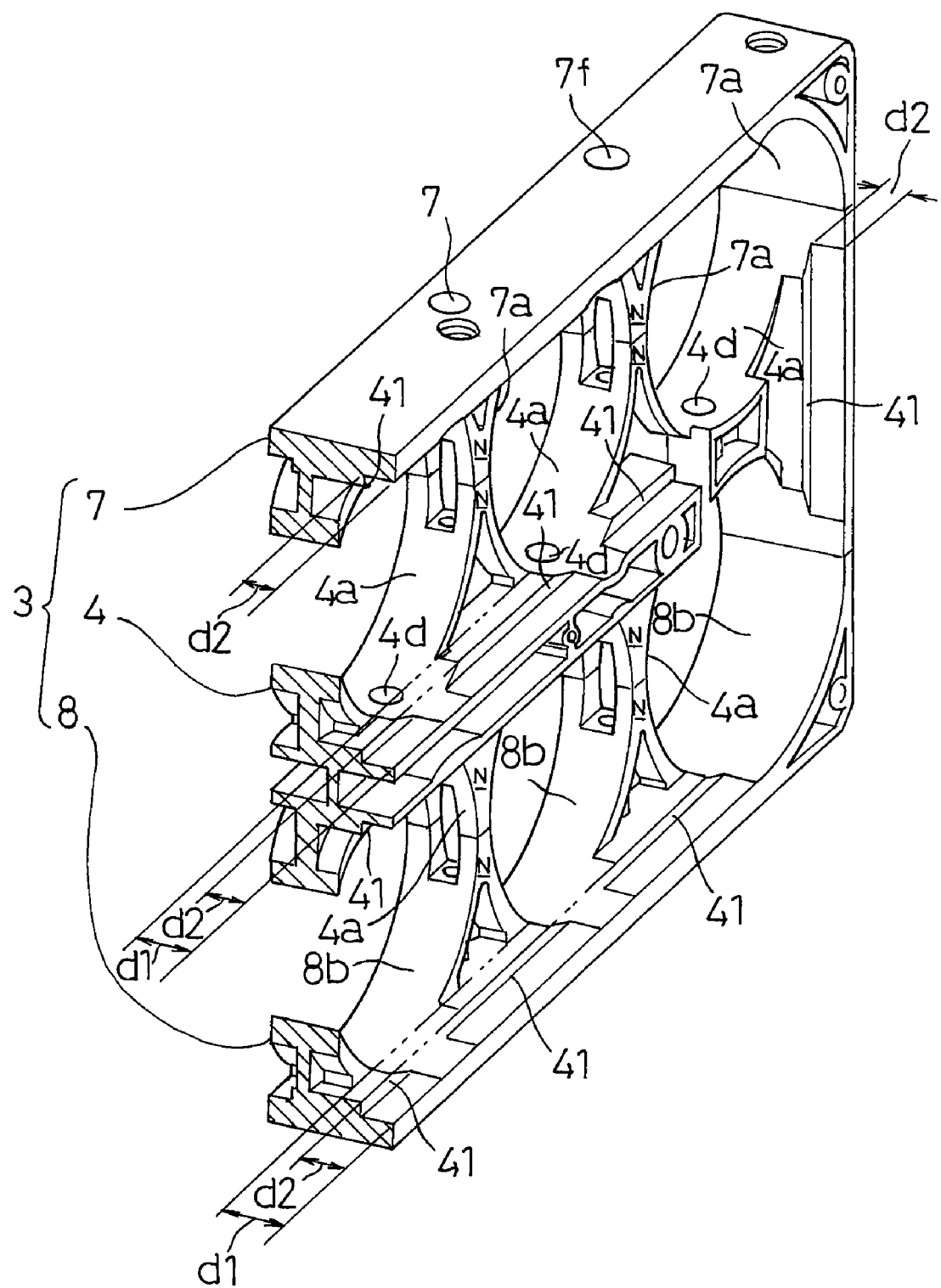
FIG. 9 is a partly broken perspective view illustrating the above holder frame.

Next, details of the battery module 1 will be described. FIG. 7 to FIG. 9 illustrate only the holder frame 3 in the assembled state. FIG. 7 is a perspective view, shown from the front side, the front-side holder frame 3 of the battery module 1; it illustrates the outer side of the holder frame 3 of the battery module 1. FIG. 8 is a perspective view, shown from the front side, the rear-side holder frame 3 of the battery module 1; it illustrates the inner side of the holder frame 3 of the battery module 1. FIG. 9 is a partly broken perspective view.

As shown in FIG. 8, multiple recesses are formed around the holding parts 4a, 7b, and 8b on the inner side of the inner frame 4 and the first and second outer frames 7 and 8, but these recesses are formed for reducing weight of the molded component; the frames function the same as those with all the portions except for the holding parts 4a, 7b, and 8b being formed flat.

On the outer side of the inner frame 4 and the first and second outer frames 7 and 8, on the other hand, as shown in FIG. 7 and FIG. 9, the holding parts 4a, 7b, and 8b of the respective frames 4, 7, and 8, except for the tops of the semi-circles, are formed in the recess N dented inwards by a predetermined step d1 from the outer surface. Furthermore, two holding parts 4a, 7b, and 8b adjoining each other in the left and right direction of the drawing are connected together by an upper and a lower linear guide supports 41 extending parallel to the direction of arrangement of the holding parts 4a, 7b, and 8b in a recessed position dented inwards by a step d2, which is smaller than the above-mentioned step d1, from the outer surface. Furthermore, the two holding parts 4a vertically opposite each other at the left end of FIG. 7 (right end of FIG. 9) of the inner frame 4 are connected together by a linear guide support 42 extending in the up and down direction in a recessed position dented inwards by the above-mentioned step d2 from the outer surface.

The guide support 42 and a retaining stand-up wall 43 opposite each other in the left and right direction at the left end of FIG. 7 are spaced from each other by a face-to-face distance R, which is generally the same as the width between a pair of lateral sides 12a and 12b of the connecting part 12 of the inter-battery connection plate 9 described with reference to FIG. 2.

Therefore, when fixing the ten cylindrical batteries 2 using the holder frames 3, the connecting parts 12 of the inter-battery connection plates 9 attached to each two adjacent cylindrical batteries 2 are fitted in between the pairs of guide supports 41 vertically opposite each other. Also, the connecting parts 12 of the inter-battery connection plates 9 attached to the two vertically adjacent cylindrical batteries 2 at the left end of FIG. 7 are fitted in between the vertically extending guide support 42 and the retaining stand-up wall 43.

Figure 11:
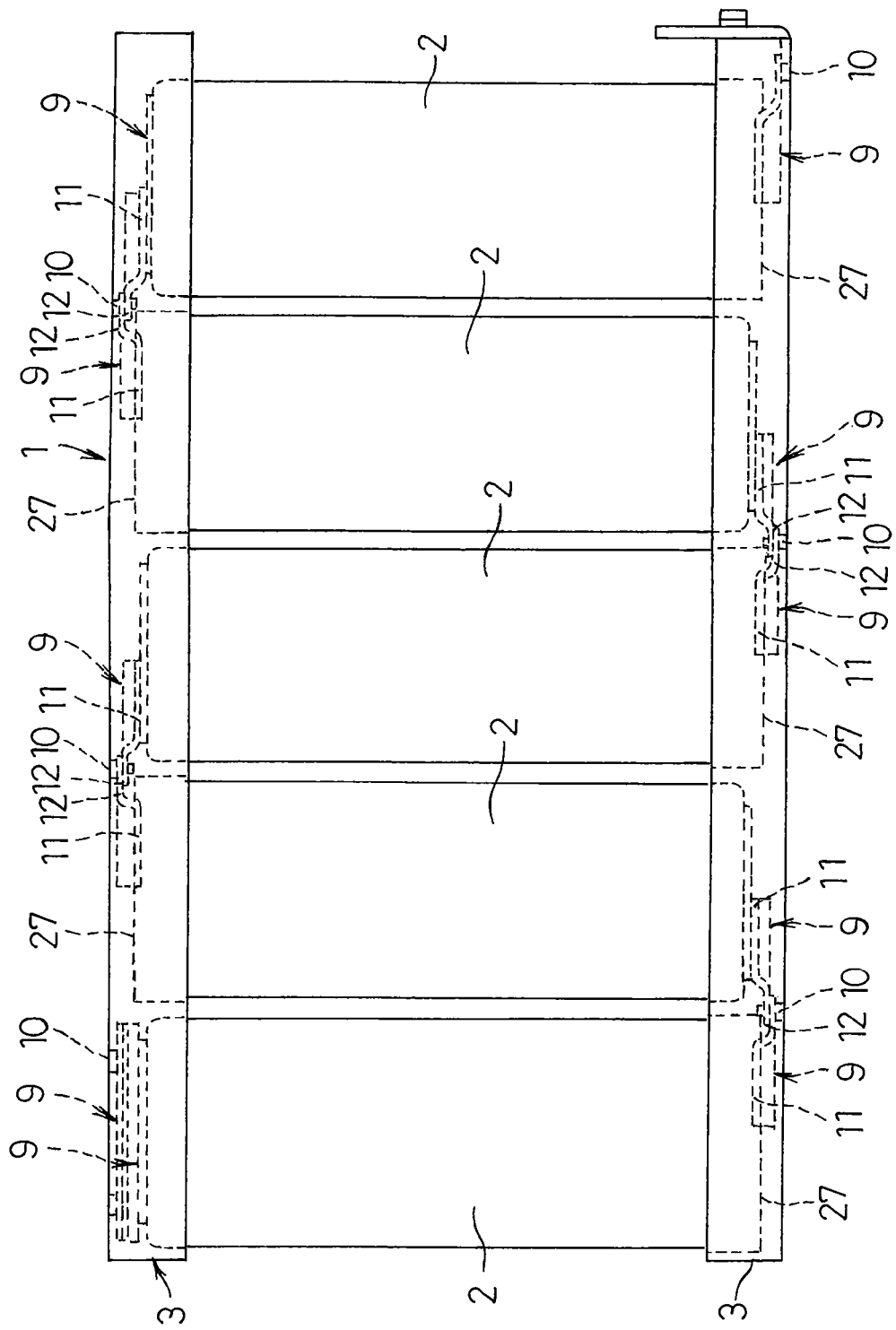
FIG. 11 is a plan view of the above battery module.

The guide supports 41 and 42 are dented from the outer surface by d2, which is slightly larger than the total sum of the thickness of the two inter-battery connection plates 9 and the height of the thread of the bolts 10. The difference (d1-d2) between the step d1 and the step d2 is slightly larger than the height of the thread of the bolts 10 protruding from the nuts 23 they are engaged with. Therefore, as shown in FIG. 11 which is a plan view of the battery module 1 of FIG. 1, the inter-battery connection plates 9, bolts 10, and nuts 23 are all encased inside the holder frame 3 and do not protrude to the outside. Accordingly, this battery module 1 does not specifically require an insulating means for preventing electrical short-circuiting across two cylindrical batteries 2.

Figure 10:
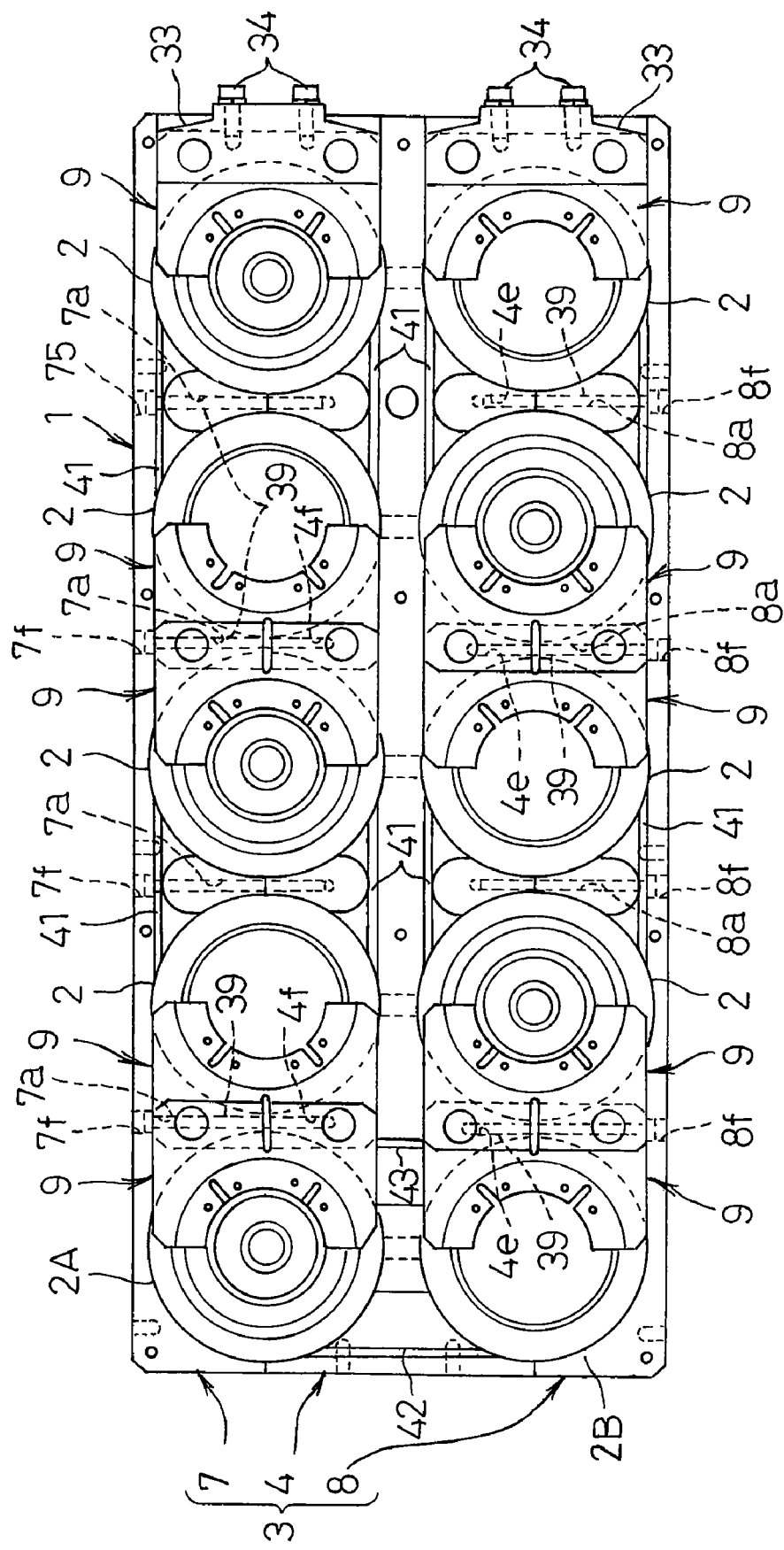
FIG. 10 is a front view of the above battery module.

Moreover, as shown in FIG. 10 which is a front view of the above battery module 1, the threads of the fastening screws 39 that fasten the inner frames 4 and the first and second outer frames 7 and 8 together are accommodated in recesses 7f and 8f that communicate with the through holes 7e and 8e. When forming a battery pack using a necessary number of these battery modules 1, since the inter-battery connection plates 9, bolts 10, and nuts 23 are all encased inside the holder frames 3 and no components protrude from the pair of rectangular parallelepiped holder frames 3, multiple battery modules 1 can be readily fixed to each other in various matrix arrangements.

Since each of the inter-battery connection plates 9 is fixed in position as they are fitted in between the pairs of vertically opposite guide supports 41 and in between the guide support 42 and the retaining stand-up wall 43, the battery module 1 has an enhanced rigidity, which is preferable for applications where large cylindrical batteries 2 are used as individual cells. Moreover, this feature enables that, in the assembling process, two adjacent inter-battery connection plates 9 are held in position such that their connecting parts 12 overlap each other and their fastening holes 22 match each other in position, which improves the operation efficiency of fastening the bolts 10 with the nuts 23.

As shown in FIG. 10, in the front-side holder frame 3, every other pair of guide supports 41 in the left and right direction and the guide support 42 and retaining stand-up wall 43 are not being used as supports of the inter-battery connection plates 9. On the other hand, in the rear-side holder frame 3, which is used in an orientation achieved by rotating the front-side holder frame 3 around the axes of the cylindrical batteries 2, the guide supports 41 and 42 in the left and right direction and retaining stand-up wall 43 that are not used on the front side are being used as supports of the inter-battery connection plates 9. That is, on the outer side of the holder frame 3, guide supports 41 are formed between every two holding parts 4a, 7b, and 8b adjoining in the left and right direction, and the guide support 42 and retaining stand-up wall 43 are formed between the vertically adjacent holding parts 4a at the left end, so that holder frames 3 of the same shape can be used for both of the front side and the back side. As ten cylindrical batteries 2 are connected in the arrangement shown in FIG. 5, some of the holding parts 4a (sic) or the guide support 42 and retaining stand-up wall 43 are left unused as described above, but this poses no problem for the holder frame 3 to exhibit its functions.

The above embodiment showed one example in which the inner end surfaces 7d and 8d of both first and second outer frames 7 and 8 shown in FIG. 6 respectively make contact with the inner end surfaces 4c of the inner frame 4 so as to form circular through holes that conform to the outer shape of the cylindrical batteries 2 by each two corresponding semi-circular holding parts 7b and 4a or 8b and 4a. As an alternative, the inner end surfaces 4c, 7d, and 8d of the inner frame 4 and both outer frames 7 and 8 may be made shorter than illustrated to give a space therebetween, so that only the outer end surfaces 4b, 7c, and 8c make contact with each other. In this case, the frames 4, 7, and 8 are slightly deformed elastically during the screw fastening of the fixing screws 39 so that the holding parts 4a, 7b, and 8b make tight contact with the outer surfaces of the cylindrical batteries 2, whereby the batteries are held even more securely.

Next, other examples of the holder frames of the present invention and other shapes of the holding parts will be described with reference to FIG. 12 to FIG. 26.

Figure 12:
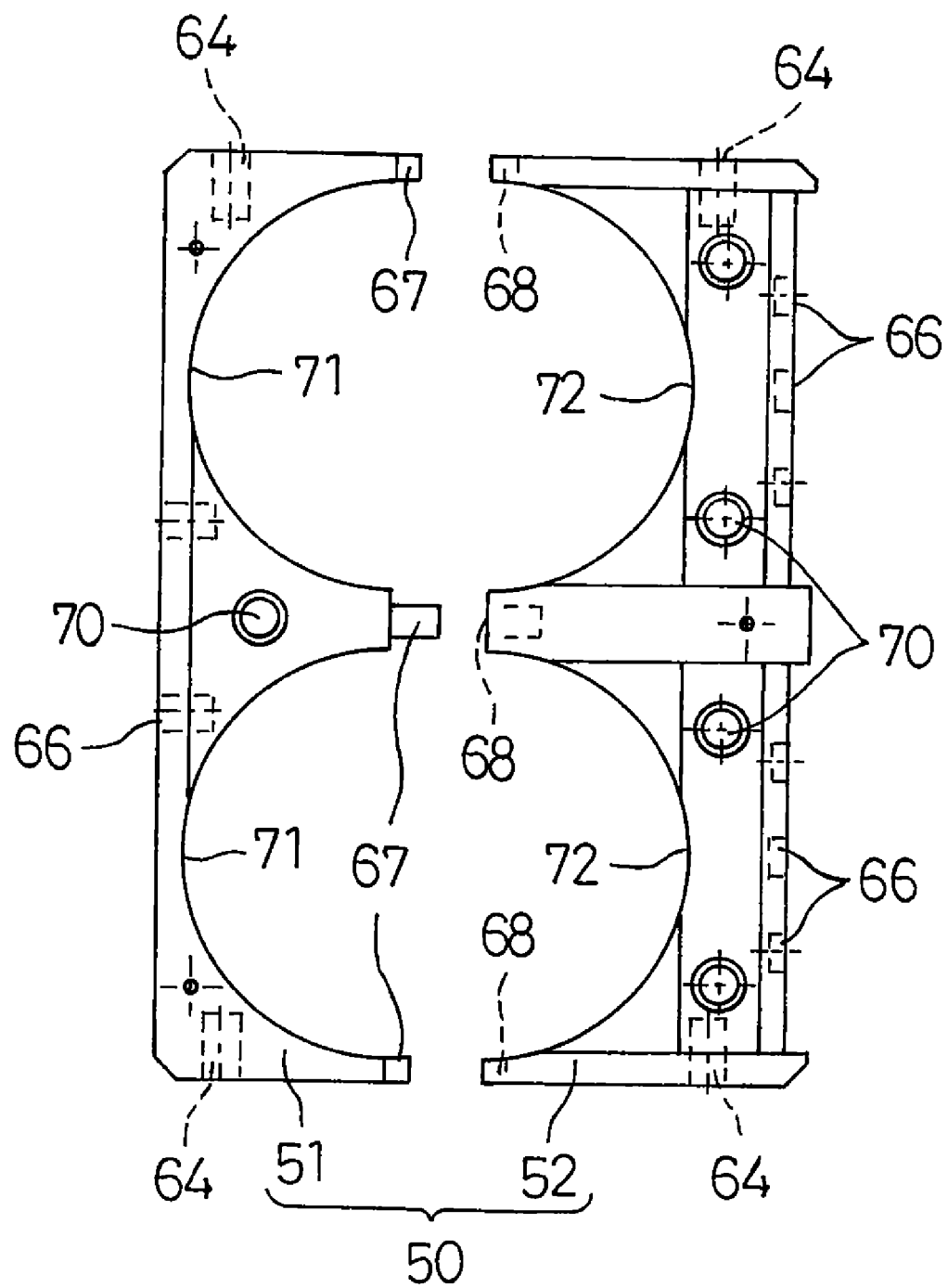
FIG. 12 is a plan view illustrating the structure of another example of the holder frame of the invention.

FIG. 12 is a plan view illustrating the structure of another example of the holder frame 50 of the invention. The holder frame 50 consists of outer frames 51 and 52, each of which includes holding parts 71 and 72 that make contact with the outer surfaces of the cylindrical batteries 2. These holding parts 71 and 72 are respectively formed semi-circular with such a radius of curvature that they generally conform to one half of the outer circumference of the cylindrical batteries 2, so that, when the outer frames 51 and 52 are joined together to form the holder frames 50, the outer circumference of the cylindrical batteries 2 fits snugly in the holding parts 71 and 72. To ensure coupling without misalignment between the outer frames 51 and 52, the outer frame 51 includes coupling projections 67 at positions where it is joined to the outer frame 52, and the outer frame 52 includes coupling recesses 68 in the shape that matches the coupling projections 67 at positions where it is joined to the outer frame 51.

Figure 13A:
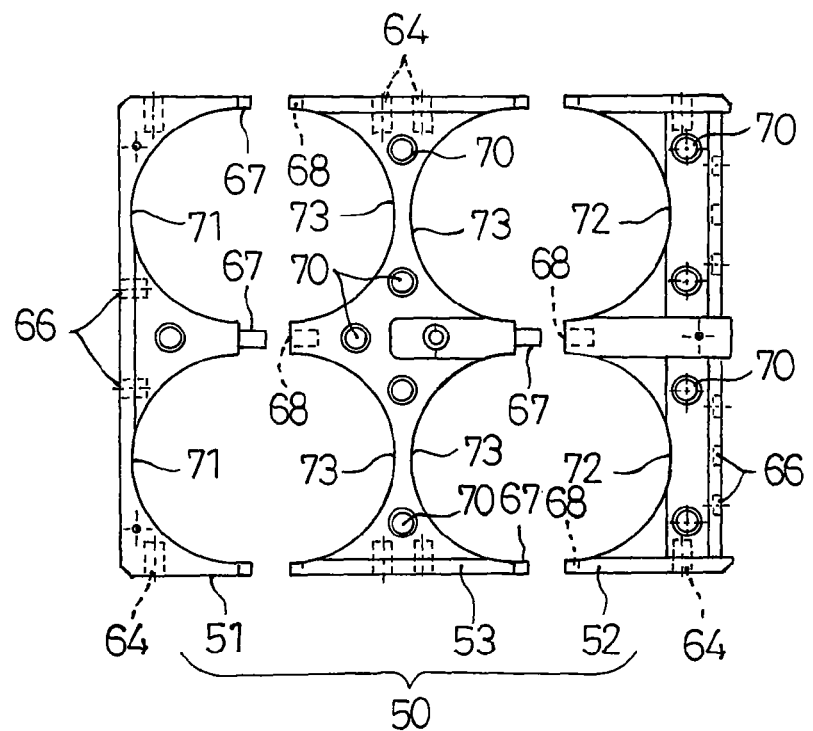
FIG. 13A is a plan view illustrating the structure of the above holder frame in which one inner frame is used.
Figure 13B:
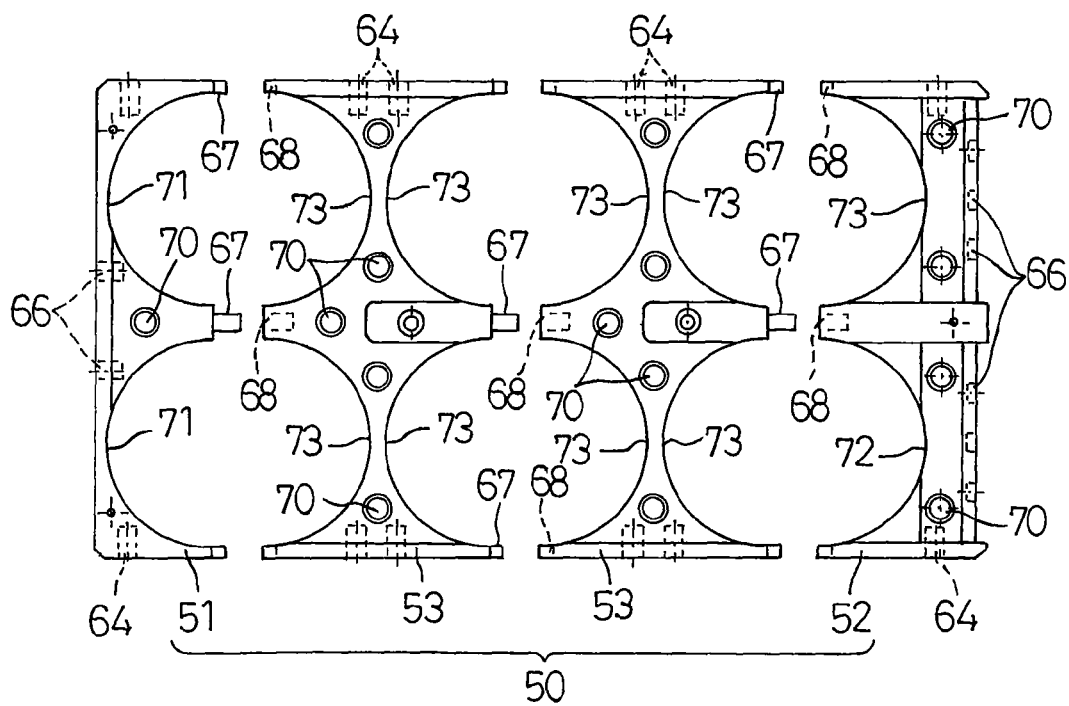
FIG. 13B is a plan view illustrating the structure in which two inner frames are used.

FIG. 13A and FIG. 13B are plan views showing the structure of the holder frame 50 that is formed by combining an inner frame 53 in addition to the outer frames 51 and 52. The inner frame 53 is formed on both sides with semi-circular holding parts 73 having such a radius of curvature that they generally conform to one half of the outer circumference of the cylindrical batteries 2. Coupling projections 67 are provided on one side of the inner frame 53, and coupling recesses 68 that match the coupling projections 67 in shape are provided on the other side. Therefore, the holder frame 50 may be formed using one inner frame 53 and outer frames 51 and 52 joined together to hold a maximum of four cylindrical batteries as shown in FIG. 13A, or, the holder frame 50 may be formed using two inner frames 53 and outer frames 51 and 52 joined together to hold a maximum of six cylindrical batteries 2 as shown in FIG. 13B, one of which can be selected as required. The illustrated examples are not the only possible forms; it is possible to freely construct a holder frame 50 that can hold a necessary number of cylindrical batteries 2 by increasing the number of the inner frames 53 as required.

Figure 14:
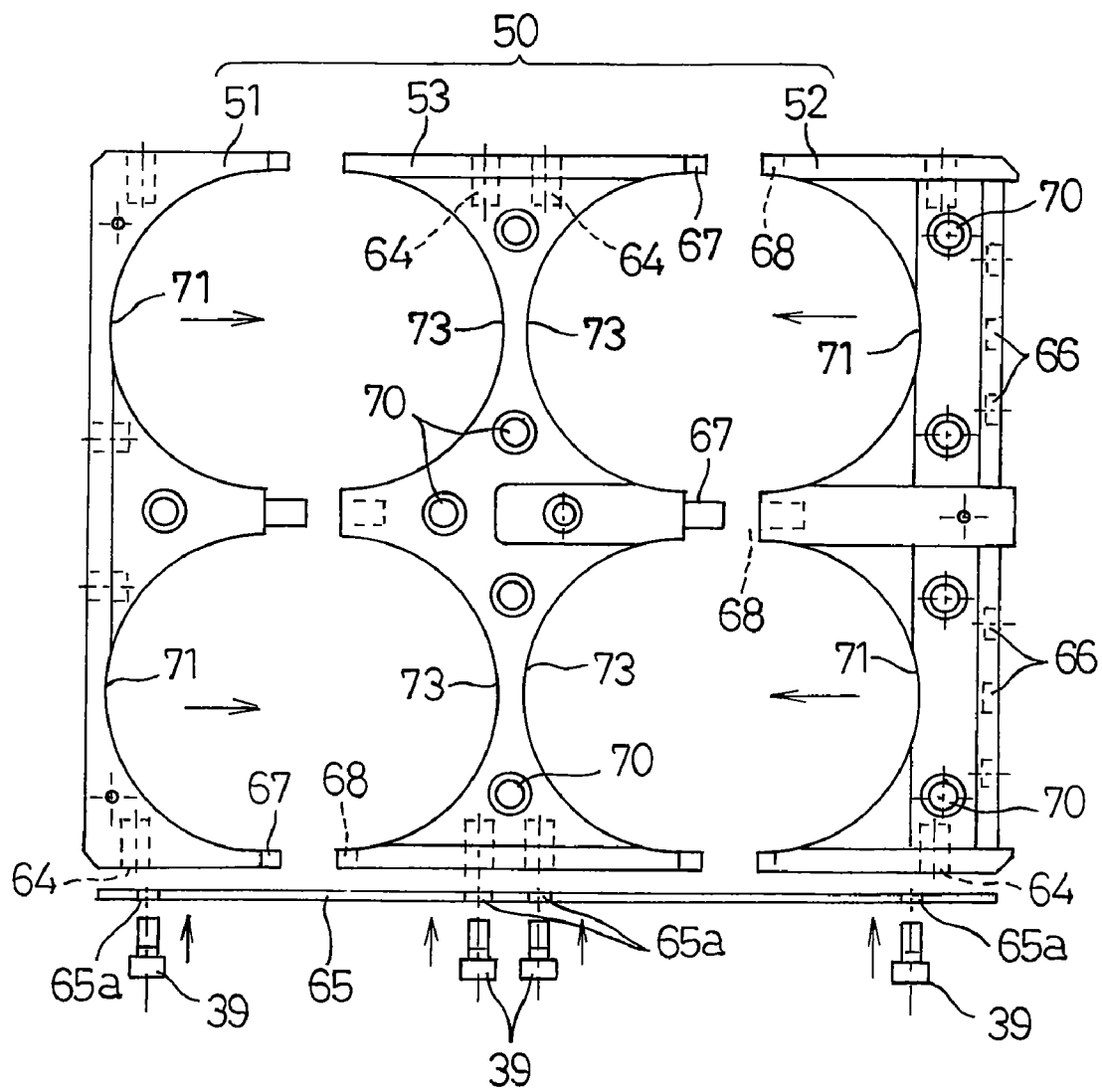
FIG. 14 is a diagram illustrating one example of how the holder frame of the invention is fastened.

Next, one example of joining two outer frames 51 and 52 and one inner frame 53 to form the holder frame 50 will be described with reference to FIG. 14. First, the coupling projections 67 of one outer frame 51 are fitted into the coupling recesses 68 of the inner frame 53 so that one outer frame 51 and the inner frame 53 are coupled together tightly. Next, the coupling projections 67 of the inner frame 53 are fitted into the coupling recesses 68 of the other outer frame 52 so that the inner frame 53 coupled to one outer frame 51 is joined tightly to the other outer frame 52. A coupler 65 having a length generally the same as the joined frames (in the left and right direction of the drawing) is abutted on the surface that extends in the direction of connection of the frames 51, 52, and 53, and fixing screws 39 are fastened into screw holes 64 at predetermined positions of the outer frames 51 and 52 and inner frame 53 through fastening holes 65a provided at predetermined positions of the coupler 65, so as to fasten the holder frame 50. The holder frame 50 may be fastened by other methods other than providing the coupler 65 on one surface of the holder frame 50; the coupler may be provided on both sides of the holder frame 50 and fastened with the fixing screws 39. Or, the coupler 65 may have an L-shaped cross section or include reinforcement ribs to increase its strength against bending.

Figure 15:
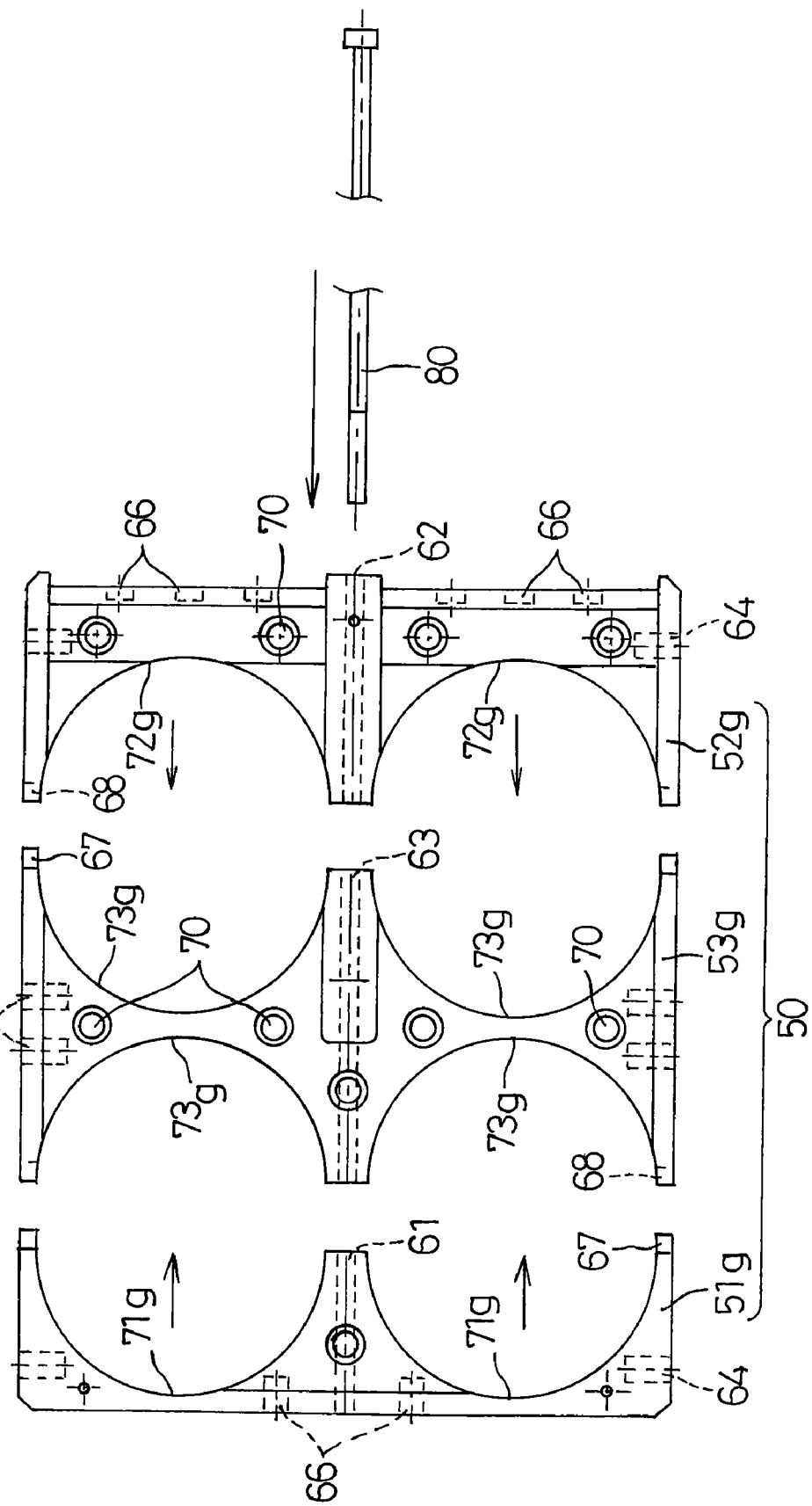
FIG. 15 is a diagram illustrating another example of how the holder frame of the invention is fastened.
Figure 16:
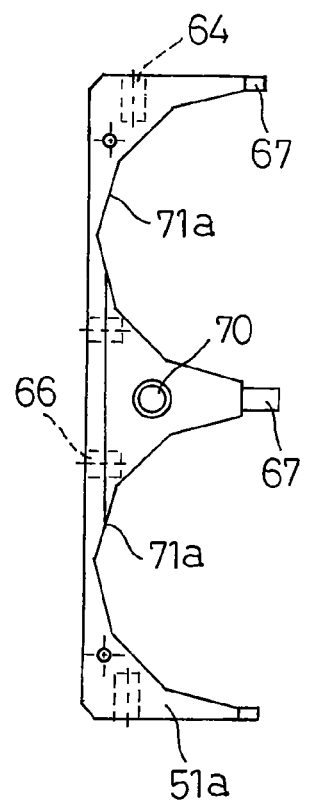
FIG. 16 is a plan view illustrating the structure of the outer frame provided with polygonal holding parts.

FIG. 15 shows another example of joining method when making the holder frame 50. The holder frame 50 shown in FIG. 15 consists of outer frames 51g and 52g and an inner frame 53g. The outer frames 51g and 52g and inner frame 53g do not include coupling projections or recesses in between each two holding parts 71g, 72g, and 73g adjoining each other in the direction along the lateral sides of the frames. Instead, through holes 61, 62, and 63 extend along the direction of connection of the frames, so that when one outer frame 53g and the other frame 52g are joined to the inner frame 53g, these through holes 61, 62, and 63 make one continuous through hole. A bar screw 80 is inserted from a direction indicated by the arrow in the drawing into the continuous through hole, and the distal end of the bar screw 80 is tightened with a nut, to firmly fasten the holder frame 50. Alternatively, an inner nut (not shown) may be provided at the left end of the through hole 61 in FIG. 15 so that the distal end of the bar screw 80 is tightened into this inner nut, to fasten the holder frame 50. Note that various lengths of bar screws 80 can be prepared beforehand, so that the holder frame 50 can be freely constructed to hold a desired number of cylindrical batteries 2, using a bar screw having a length that corresponds to the length (in the left and right direction of the drawing) of the holder frame 50, which changes by the number of the inner frame 53g being used.

Next, various examples of modification to the holding parts will be described. The outer frame 51a shown in FIG. 16 has polygonal holding parts 71a. With this design in which the holding parts 71a are polygonal having such a radius of curvature that they generally conform to one half of the outer circumference of the cylindrical batteries 2, there are small gaps between the holding parts 71a and the outer surfaces of the cylindrical batteries 2. Therefore, while the cylindrical batteries 2 are firmly held, these gaps help dissipate the heat generated during charge and discharge. Also, the polygonal holding parts 71a would be able to accommodate contour variation of the batteries relatively flexibly and hold the batteries well despite such variation.

Figure 17:
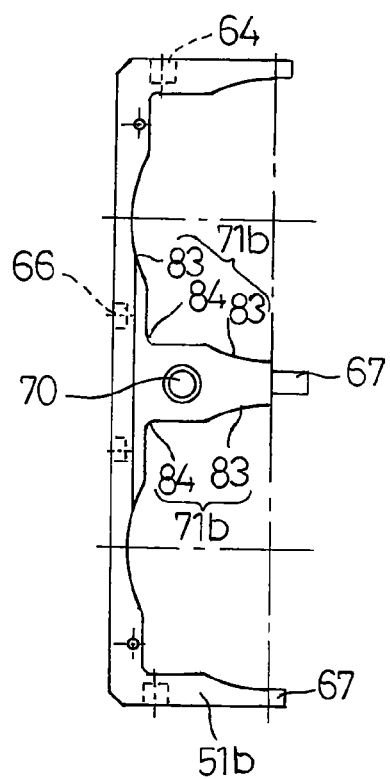
FIG. 17 is a plan view illustrating the structure of the outer frame provided with holding parts that combine circular arc parts and right-angled parts.

The outer frame 51b shown in FIG. 17 has holding parts 71b, which are a combination of circular arc parts 83 that have generally the same radius of curvature as that of the outer circumference of the cylindrical batteries 2, and right-angled parts 84. With such holding parts 71b, not only cylindrical batteries 2 but also prismatic batteries can be held. When cylindrical batteries 2 are held, the right-angled parts 84 of the holding parts 71b provide heat release space, and when prismatic batteries are held, the circular arc parts 83 provide heat release space.

Figure 18:
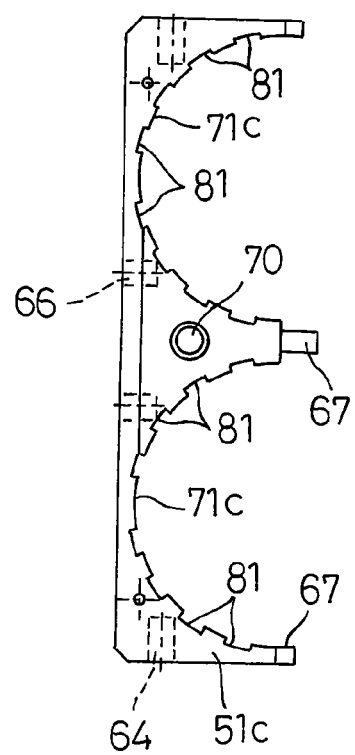
FIG. 18 is a plan view illustrating the structure of the outer frame provided with holding parts having notches.

The outer frame 51c shown in FIG. 18 has holding parts 71c, which include notches 81 in the semi-circular surface that has such a radius of curvature that it generally conforms to one half of the outer circumference of the cylindrical batteries 2. With such holding parts 71c, when cylindrical batteries 2 are held, the notches 81 function as heat release space.

Figure 19:
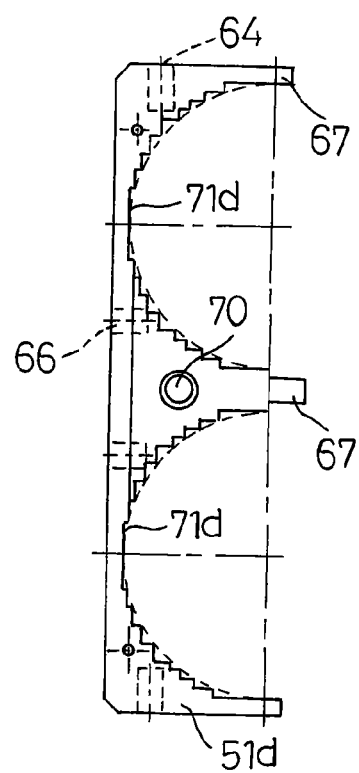
FIG. 19 is a plan view illustrating the structure of the outer frame provided with stepped holding parts.

The outer frame 51d shown in FIG. 19 has holding parts 71d with a stepped surface; the line connecting the tops of the steps forms a semi-circle having such a radius of curvature that it generally conforms to one half of the outer circumference of the cylindrical batteries 2. With these holding parts 71d having such a stepped surface, when cylindrical batteries 2 are held, the gaps between the steps and the outer surfaces of the cylindrical batteries 2 function as heat release space.

Figure 20A:
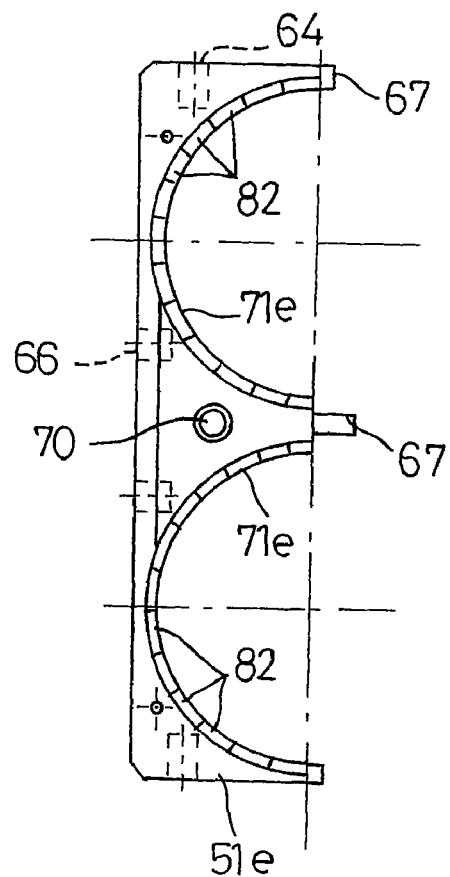
FIG. 20A is a plan view and FIG. 20B is an enlarged view of major parts illustrating the structure of the outer frame provided with holding parts having apertures and air passages.
Figure 20B:
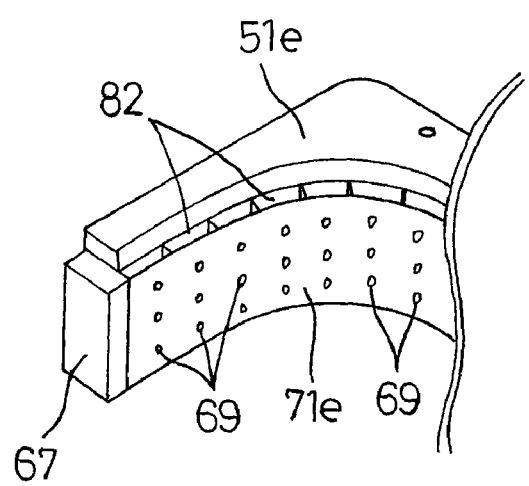

The outer frame 51e shown in FIG. 20A and FIG. 20B has holding parts 71e, which include multiple apertures 69 in the semi-circular surface that has such a radius of curvature that it generally conforms to one half of the outer circumference of the cylindrical batteries 2. The holding parts 71e have a double-layer structure with an inner semi-circular surface and an outer semi-circular surface. The inner semi-circular surface has the matching radius of curvature so that it generally conforms to one half of the outer circumference of the cylindrical batteries 2. Between the inner semi-circular surface and outer semi-circular surface of the holding parts 71e are provided multiple air passages 82. With the multiple apertures 69 provided in the inner semi-circular surface that makes contact with the outer surfaces of the cylindrical batteries 2, the heat generated during charge and discharge of the batteries is dissipated from these apertures 69 and through the air passages 82. The number and pattern of arrangement of the apertures 69 may be suitably set in accordance with the heat generation amount of the batteries.

Figure 21:
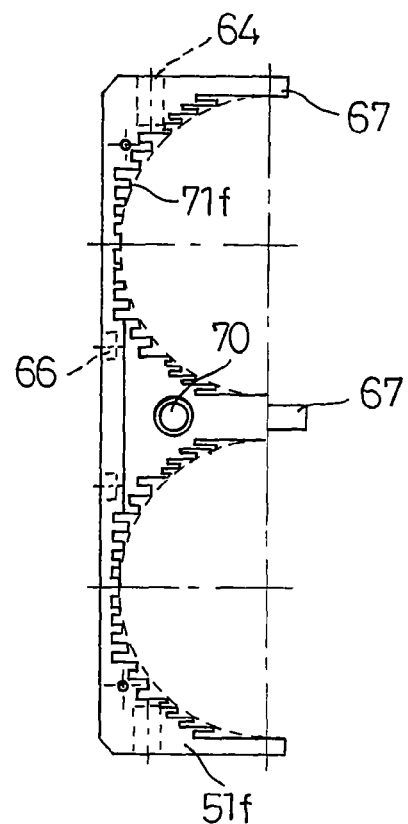
FIG. 21 is a plan view illustrating the structure of the outer frame provided with comb-shaped holding parts.

The outer frame 51f shown in FIG. 21 has comb-shaped holding parts 71f; the line connecting the tops of the comb teeth forms a semi-circle having such a radius of curvature that it generally conforms to one half of the outer circumference of the cylindrical batteries 2. With such comb-shaped holding parts 71f, while cylindrical batteries 2 are firmly held, the gaps between the comb teeth function as heat release space. Note, the examples described above have been illustrated as the structure provided to one outer frame, but the other outer frame, which respectively corresponds to each of the outer frames 51a to 51f, and the inner frame, may have the same holding parts as the holding parts 71a to 71f of the outer frames 51a to 51f.

Figure 22:
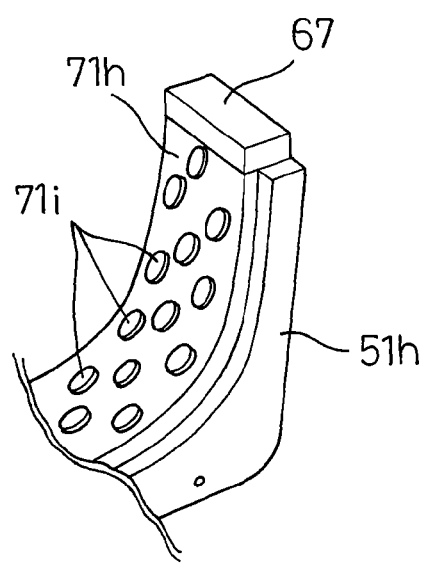
FIG. 22 is an enlarged view of major parts illustrating the structure of the outer frame provided with holding parts having multiple projections.

Multiple projections 71i may be provided to holding parts 71h of the outer frame 51h, as shown in FIG. 22. With the holding parts 71h shown in FIG. 22, the line connecting the tops of the projections 71i is semi-circular with generally the same radius of curvature as that of the outer circumference of the cylindrical batteries 2. When cylindrical batteries 2 are held using this holder frame 51h, there are gaps between the holding parts 71h and the outer surfaces of the cylindrical batteries 2 by the height of the projections 71i, and these gaps function as heat release space for releasing heat generated during charge and discharge. The shape of the projections 71h should not be limited to the circle as illustrated but may be formed in various other shapes.

Figure 23:
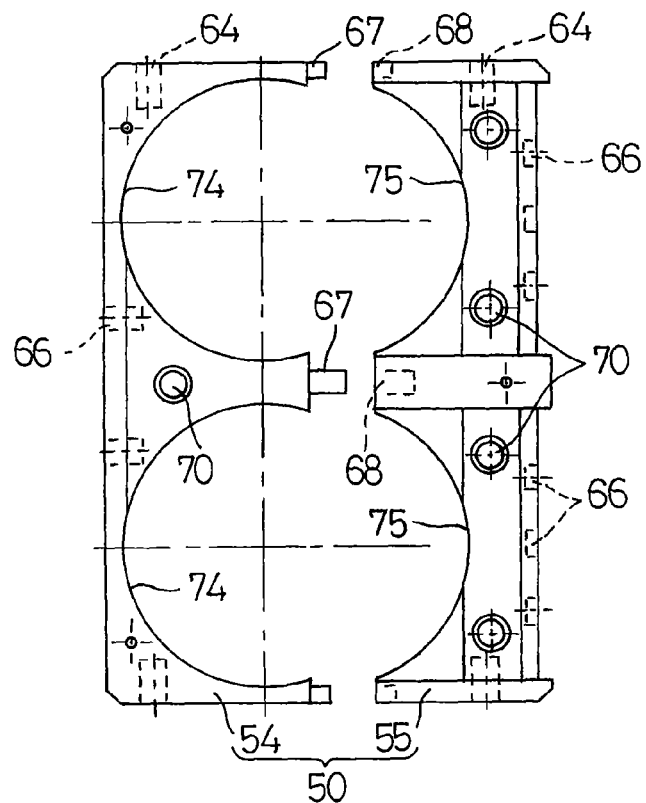
FIG. 23 is a plan view illustrating the structure of another example of the holder frame in the present invention.

FIG. 23 shows another structure for the holder frame 50. The holder frame 50 shown in FIG. 23 is made up of an outer frame 54 having holding parts 74 with generally the same radius of curvature as that of the cylindrical battery 2 and a circular arc not shorter than one half of the circumference of the battery, and another outer frame 55 having holding parts 75 with generally the same radius of curvature as that of the cylindrical battery 2 and a circular arc not longer than one half of the circumference of the battery. When one outer frame 54 and the other outer frame 55 are coupled together, their holding parts 74 and 75 opposite each other form a circle that has the same radius of curvature as that of the cylindrical battery 2 and that conforms to the entire circumference of the battery. The outer frames 54 and 55 are coupled together by fitting the coupling projections 67 of the outer frame 54 into coupling recesses 68 of the outer frame 55. With this structure, the cylindrical batteries 2 fitted in the holding parts 74 are stably held there before the holder frame 50 is complete, and since it is not necessary to provide additional fixing means for securing the cylindrical batteries 2 in position during the assembling of the holder frame 50, the process is made simple and the cost is reduced. FIG. 23 illustrates the structure of the holder frame 50 with only outer frames 54 and 55, but the holder frame 50 may also include an inner frame, which has holding parts on one side that have generally the same radius of curvature as that of the cylindrical battery 2 and a circular arc not longer than one half of the circumference of the battery and holding parts on the other side that have generally the same radius of curvature as that of the cylindrical battery 2 and a circular arc not shorter than one half of the circumference of the battery. Thereby, the holder frame 50 can be freely constructed to hold a desired number of cylindrical batteries 2 in accordance with the purposes of use. These outer frames 54 and 55 and inner frame may be fastened together with the method using the coupler 65 shown in FIG. 14, or with the method using the bar screw 80 shown in FIG. 15.

Figure 24:
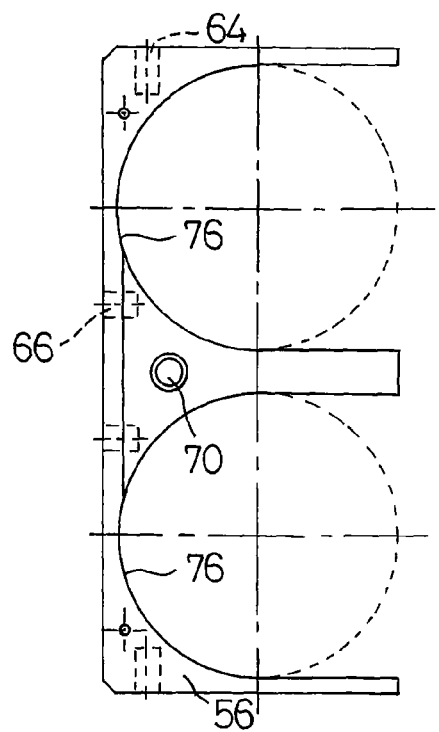
FIG. 24 is a plan view illustrating the structure of yet another example of the outer frame in the present invention.
Figure 26:
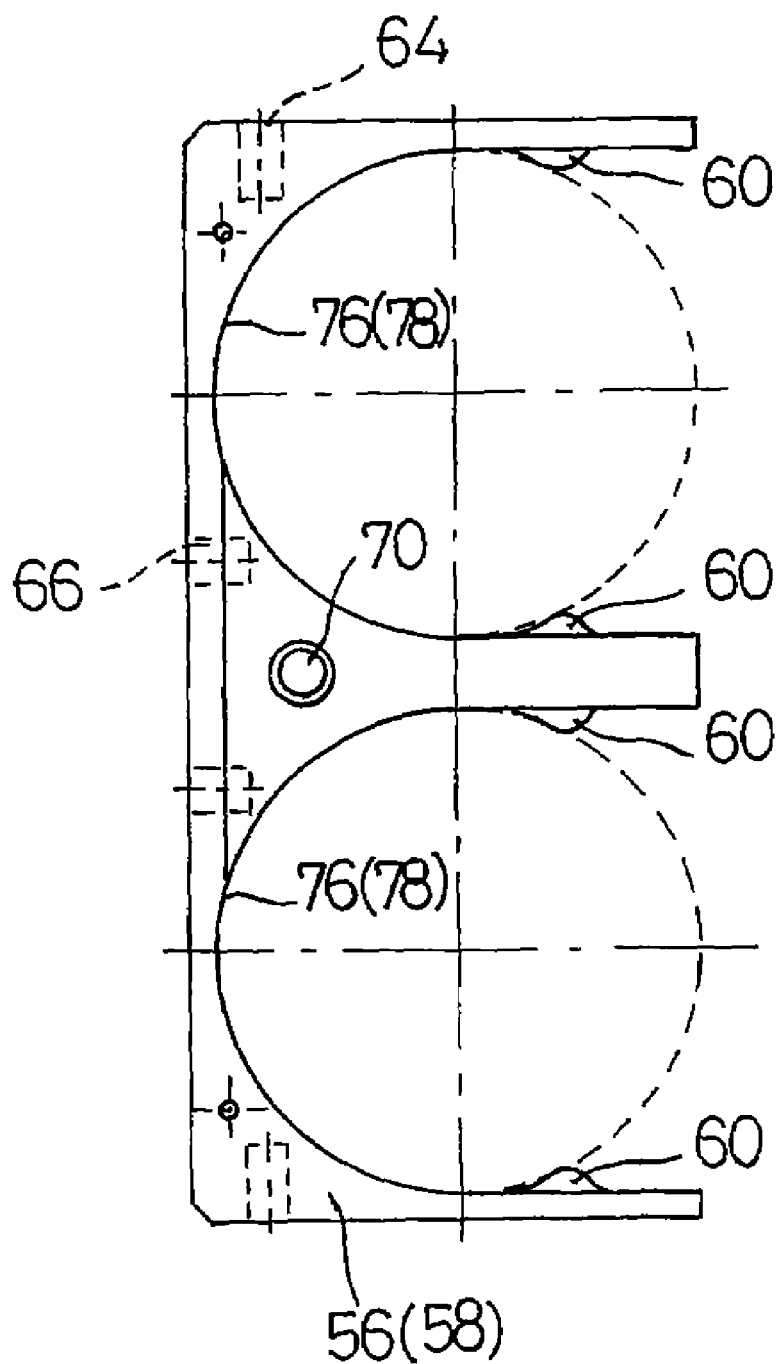
FIG. 26 is a plan view illustrating the structure provided with fixing portions for holding the cells in position in the holding parts of the above outer frame and/or inner frame.

FIG. 24 to FIG. 26 illustrate yet another example of the holder frame 50. The outer frame 56 shown in FIG. 24 has holding parts 76, which consist of a circular arc part having such a radius of curvature that it generally conforms to one half of the circumference of the cylindrical batteries 2 and linear parts extending from both ends of the circular arc part as long as the outer dimensions of the cylindrical battery 2. The other outer frame 57 that is coupled to this outer frame 56 to form the holder frame 50 is a flat plate as shown in FIG. 25A. With these outer frames 56 and 57 having such shapes, since the cylindrical batteries 2 can be held by one outer frame 56, the other outer frame 57 has a simple design and the cost is reduced, as well as the effect of improving work efficiency is achieved. As shown in FIG. 25B, an inner frame 58 may also be used, with holding parts 78 that consist of a circular arc part having such a radius of curvature that it generally conforms to one half of the circumference of the cylindrical batteries 2 and linear parts extending from both ends of the circular arc part as long as the outer dimensions of the cylindrical battery 2. By combining such an inner frame 58 with the outer frames 56 and 57, the holder frame 50 can be freely constructed to hold a desired number of cylindrical batteries 2 in accordance with the purposes of use. As shown in FIG. 26, fixing portions 60 may be provided on the linear parts of the holding parts 76 (78) of the outer frame 56 (inner frame 58) for retaining cylindrical batteries 2, so that the cylindrical batteries are held stably with these fixing portions 60 and thereby the effect of improving work efficiency of fastening the holder frame 50 is achieved. The holder frame 50 shown in FIG. 24 to FIG. 26 may be fastened with the method using the coupler 65 shown in FIG. 14, with the method using the bar screw 80 shown in FIG. 15, and with various other means such as adhesive, heat-sealing, heat welding, ultrasonic welding, fastening springs, and others.

The outer frames 51, 51a to 51h, 52, 54 to 57 and the inner frames 53 and 58 shown in FIG. 12 to FIG. 26 are provided with screw holes 64 with which fixing screws 39 will be thread-engaged for fastening the holder frame 50 using the coupler 65, and the outer frames 51, 51a to 51h, 52, 54 to 57 are provided with terminal screw holes 66 with which terminal screws 34 will be thread-engaged. Also, the outer frames 51, 51a to 51h, 52, 54 to 57 and the inner frames 53 and 58 are provided with inner nut mounting holes 70 at predetermined positions, with which the bolts 10 for coupling together the inter-battery connection plates 9 will be thread-engaged. It should be understood that the outer frames 54 and 55 shown in FIG. 23 and the outer frame 56 and the inner frame 58 shown in FIG. 24 to FIG. 26 may have holding parts 74, 75, 76, and 78 in the same shape as any of the holding parts 71a to 71h shown in FIG. 16 to FIG. 22.

The material of the holder frame described in the above embodiments may be at least one selected from the following group: Modified polyphenylene ether resin, modified polyphenylene oxide resin, ABS resin, polyethersulfon resin, polyetherimide resin, polyimide resin, metal material, or heat-plastic polyester composite material mainly composed of polyethylene terephthalate that is filled with glass fiber or mica. Polymer material having elasticity such as rubber or the like may also be used, in which case the material preferably has a Young's modulus of about 1.5 to 7.0 MPa.

While the foregoing description has been made with respect to the structure to be used for cylindrical batteries 2, the invention is not limited to this; the battery module 1 may be used for various prismatic batteries and constructed using a holder frame having holding parts that conform to the outer dimensions of the prismatic batteries. Also, while the foregoing description has been made with respect to the examples in which the batteries 2 inside the battery module 2 are connected in series, it is possible to connect them in parallel depending on the purpose of use.

INDUSTRIAL APPLICABILITY

As described above, according to the battery module of the present invention, the outer surfaces of the cells are exposed to the outside except for their ends that are held by the holder frames, and therefore the heat dissipation effect thereby achieved is extremely high. The holder frames have a three-part structure with an inner frame and two outer frames so that even large cells can be readily mounted into predetermined locations in the holder frames. Moreover, the inner frame and two outer frames are coupled together in a detachable manner, so that the holder frames can be easily disassembled to replace only some of the cells that have been consumed or degraded. With the method of producing the battery module according to the present invention, the above battery module that provides these remarkable effects can be readily produced with high productivity.

The invention claimed is:

1. A battery module comprising: a plurality of cells; and a holder frame consisting of a plurality of frames having holding parts that fit with part of outer surfaces of the cells, wherein both axial ends of the cells are held by the holding parts of the respective frames of the holder frame, and each two adjacent cells are electrically interconnected,
    wherein each of the frames of the holder frames includes, between each two adjacent holding parts along a direction of lateral sides, screw holes in a shape that extends in a direction orthogonal to the lateral sides;
    when the frames are arranged opposite each other, the screw holes communicate with each other, and fixing screws are inserted and tightened into the screw holes so that the frames are detachably coupled together;
    each two adjacent cylindrical batteries are electrically interconnected in a detachable manner through inter-battery connection plates, which include welded parts that are welded respectively to a positive or negative terminal of the batteries, and connecting parts that extend from the welded parts in directions in which they approach each other, and the electrical connection is achieved by thread engagement between respective connecting parts of the inter-battery connection plates; and
    wherein on the outer side of each of the plural frames in the holder frame, the holding parts except for the centers are formed in a recess dented inwards by a predetermined step from the outer surface; each two adjacent holding parts are connected together by linear guide supports extending parallel to the direction of arrangement of the holding parts in a recessed position dented inwards by a step, which is smaller than the predetermined step, from the outer surface; the two holding parts at one end of the inner frame are connected together by a linear guide support in a recessed position dented inwards from the outer surface; and the connecting arts of the inter-batter connection elates fit in between the two guide supports opposite each other.

2. The battery module according to claim 1, comprising:
    a row of the cells being cylindrical batteries arranged axially in parallel to each other;
    holder frames arranged at both axial ends of the cylindrical batteries, the holder frame being formed integrally in the shape of a rectangular parallelepiped by detachably coupling together the plurality of frames,
    wherein the frames that are opposite each other in the holder frames include the same number of holding parts as the number of batteries, making contact with the outer surfaces of the cylindrical batteries;
    both axial ends of the cylindrical batteries are tightly held from both sides by the holding parts respectively provided to opposite frames of the holder frames; and
    the cylindrical batteries adjoining each other in the row of batteries are electrically interconnected via inter-battery connection plates.

3. The battery module according to claim 2, wherein:
    the rows of batteries includes a first row of batteries and a second row of batteries, both made up of the same number of cylindrical batteries arranged axially in parallel to each other;
    the holder frames provided at both axial ends of the first and second rows of batteries are integrated to rectangular parallelepipeds and each consists of an inner frame, a first outer frame arranged along one side of the inner frame, and a second outer frame arranged along the other side of the inner frame, these frames being detachably coupled together;
    the holding parts that make contact with the outer surfaces of the cylindrical batteries and hold them are provided in the same number as the number of the batteries in the rows of batteries in both lateral sides of the inner frame, in the side of the first outer frame opposite the inner frame, and in the side of the second outer frame opposite the inner frame;
    both the axial ends of the first row of cylindrical batteries are tightly held from both sides by the respective holding parts of the first outer frame and the inner frame opposite each other of each holder frame;
    both the axial ends of the second row of cylindrical batteries are tightly held from both sides by the respective holding parts of the second outer frame and the inner frame opposite each other of each holder frame;
    adjacent cylindrical batteries in the first and second rows are electrically interconnected through inter-battery connection plates; and
    two cylindrical batteries at respective ends of both the rows of batteries are electrically interconnected through inter-battery connection plates.

4. The battery module according to claim 3, wherein the holding parts in each frame of the holder frame are formed in the shape of a semi-circle having a radius of curvature that conforms to an outer shape of the battery.

5. The battery module according to claim 3, wherein the inner frame includes battery retaining holes extending between centers of two opposite holding parts between both lateral sides, and retaining plug members having elasticity and shaped longer than a length of the battery retaining holes, the plug members being inserted in the battery retaining holes.

6. The battery module according to claim 1, wherein the holder frame that holds one axial end of the cylindrical batteries and the holder frame that holds the other axial end are of the same shape, the holder frame that holds the other axial end being in a position along the direction of arrangement of the battery row and rotated around the battery axis.

7. The battery module according to claim 1, wherein the holder frame is formed by two outer frames each having holding parts that conform to part of the outer surfaces of the cells on one side and an inner frame having holding parts of the same shape on both sides, the outer frames are joined to both sides of the inner frame, so that opposite holding parts of the inner frame and the outer frames hold the cells from both sides.

8. The battery module according to claim 7, comprising two or more inner frames between the two outer frames.

9. The battery module according to claim 1, wherein the holding parts are formed in a semi-circular shape having such a radius of curvature that they conform to one half of the outer circumference of the cell.

10. The battery module according to claim 1, wherein one of the opposite frames of the holder frame has holding parts that have the same radius of curvature as that of the cell and a circular arc not shorter than one half of the circumference of the cell, and another frame has holding parts that have the same radius of curvature and a circular arc not longer than one half of the circumference of the cell; and, when these frames are arranged opposite each other and coupled together, the holding parts form a circular shape that matches the entire outer circumference of the cell with the same radius of curvature.

11. The battery module according to claim 1, wherein the holding parts are formed in a polygonal shape having generally the same radius of curvature as that of the outer circumference of the cell.

12. The battery module according to claim 1, wherein the holding parts are formed in a shape that combines a right-angled part and a circular arc part having the same radius of curvature as that of the outer circumference of the cell.

13. The battery module according to claim 1, wherein the holding parts are formed in a semi-circular shape with the matching radius of curvature corresponding to one half of the outer circumference of the cell with a plurality of notches in the semi-circular surface.

14. The battery module according to claim 1, wherein the holding parts are formed with steps, lines connecting tops of the steps being semi-circular having such a radius of curvature that it conforms to one half of the outer circumference of the cell.

15. The battery module according to claim 1, wherein the holding parts are formed with comb teeth, lines connecting tops of the comb teeth being semi-circular having such a radius of curvature that it conforms to one half of the outer circumference of the cell.

16. The battery module according to claim 1, wherein the holding parts are made of a material having elasticity.

17. The battery module according to claim 1, wherein the holding parts are formed such that ends thereof protrude by a length that generally covers the outer dimensions of the cells.

18. The battery module according to claim 17, wherein a flat plate is coupled to the end of the holding part in order to hold the cell.

19. The battery module according to claim 17, comprising fixing portions provided at the ends of the holding parts on lines with the same radius of curvature as that of the outer circumference of the cell for holding the cells.

20. The battery module according to claim 1, wherein an outer frame having holding parts with ends thereof protruding by a length that generally covers the outer dimensions of the cells and an inner frame having the same configuration as the outer frame are coupled to each other in the same orientation, and a flat plate is coupled to the ends of the inner frame in order to hold the cell.

21. The battery module according to claim 1, wherein the frames include screw holes in a surface extending in a direction of connection of the frames, the holes extending in a direction orthogonal to the direction of connection of the frames; after the frames are coupled together, a coupler having generally the same length as the joined frames is abutted on the surface; and fixing screws are tightened into the screw holes through the coupler, so that the holder frame is securely fastened.

22. The battery module according to claim 1, wherein each of the frames of the holder frame includes, in between each two holding parts adjoining in a direction along the lateral sides of the frames, through holes extending along a direction of connection of the frames; and when the frames are joined together, the through holes make one continuous through hole, and a bar screw is inserted and tightened into the through hole, to firmly fasten the holder frame.

23. The battery module according to claim 22, wherein the bar screw is tightened into a nut.

24. The battery module according to claim 1, wherein the holder frame is secured using a bottom plate, a case, or a frame body.

25. A production method of a battery module, the battery module including a plurality of cylindrical batteries held from both sides respectively by a pair of holder frames arranged at one and the other axial ends of the cylindrical batteries, the method comprising the steps of:

placing two first outer frames with a predetermined space therebetween, the first outer frames being formed with a predetermined number of semi-circular holding parts only in an upper side and setting the predetermined number of cylindrical batteries in parallel wherein respective halves of one and the other ends of the cylindrical batteries are fitted in the holding parts of the two first outer frames;

abutting two inner frames on the two first outer frames respectively, the inner frames being formed with a predetermined number of semi-circular holding parts in upper and lower sides, with respective halves of one and the other ends of the cylindrical batteries being fitted in the holding parts in the lower side;

electrically connecting each two adjacent cylindrical batteries using inter-battery connection plates;

joining the two first outer frames with the two inner frames respectively at one and the other ends of the cylindrical batteries using fixing screws;

setting the predetermined number of cylindrical batteries in parallel wherein respective halves of one and the other ends of the cylindrical batteries are fitted in the holding parts in the upper sides of the two inner frames;

abutting two second outer frames on the two inner frames respectively, the second outer frames being formed with a predetermined number of semi-circular holding parts only in a lower side, with respective halves of one and the other ends of the cylindrical batteries on the inner frames being fitted in the holding parts of the second outer frames;

electrically connecting each two cylindrical batteries adjoining each other between the inner frames and the second outer frames using inter-battery connection plates; and joining the two second outer frames with the two inner frames respectively at one and the other ends of the cylindrical batteries using fixing screws, wherein, before the assembling process, the two first outer frames are temporarily fixed by thread engagement on an assembling table with a predetermined space therebetween, and after the assembling, the assembling table is removed.

26. The production method of a battery module according to claim 25, wherein, after the inner frames are placed on top of the first outer frames and abutted thereon, retaining plug members are inserted into corresponding battery retaining holes that extend between the centers of each two opposite holding parts of the inner frames, wherein the retaining plug members are longer than the battery retaining holes and have elasticity, so that tips of the retaining plug members make contact with outer surfaces of the cylindrical batteries to prevent them from rotating; and the inner frames and the two outer frames are united by thread engagement to form the holder frames, wherein the retaining plug members are pressed by the outer surfaces of the cylindrical batteries on both sides and compressed inside the battery retaining holes.

27. The production method of a battery module according to claim 25, wherein a pair of inter-battery connection plates are attached beforehand to positive and negative electrode terminals of each cylindrical battery such that connecting parts of the inter-battery connection plates protrude in opposite directions to each other, or such that the connecting parts protrude in orthogonal directions to each other; and after attaching the cylindrical batteries on the holder frames, the connecting parts of the two inter-battery connection plates protruding from each two adjacent cylindrical batteries in directions in which they approach each other are overlapped and fastened together with screws so as to electrically interconnect the two adjacent cylindrical batteries.

* * * * *